US008249623B2

(12) United States Patent
Choi et al.

(10) Patent No.: US 8,249,623 B2
(45) Date of Patent: Aug. 21, 2012

(54) METHOD AND BASE STATION FOR TRANSMITTING LOCATION MEASUREMENT REFERENCE SIGNAL, AND METHOD AND USER EQUIPMENT FOR RECEIVING LOCATION MEASUREMENT REFERENCE SIGNAL

(75) Inventors: Jinsoo Choi, Anyang-si (KR); Hangyu Cho, Anyang-si (KR); Jinsam Kwak, Anyang-si (KR); Kiseon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/275,261

(22) Filed: Oct. 17, 2011

(65) Prior Publication Data

US 2012/0094687 A1 Apr. 19, 2012

Related U.S. Application Data

(60) Provisional application No. 61/393,936, filed on Oct. 17, 2010.

(30) Foreign Application Priority Data

Mar. 24, 2011 (KR) ........................ 10-2011-0026262

(51) Int. Cl.
*H04W 24/00* (2009.01)
(52) U.S. Cl. .................. 455/456.1; 455/404.2; 455/437; 370/328; 370/252

(58) Field of Classification Search ............... 455/456.1, 455/404.2, 437; 370/328, 252
See application file for complete search history.

(56) References Cited

U.S. PATENT DOCUMENTS

| 6,654,609 | B2 | 11/2003 | Kim |
| 2004/0266457 | A1 | 12/2004 | Dupray |
| 2010/0195566 | A1 | 8/2010 | Krishnamurthy et al. |
| 2010/0205283 | A1* | 8/2010 | Cho et al. ...................... 709/221 |
| 2010/0226389 | A1* | 9/2010 | Cho et al. ...................... 370/465 |
| 2010/0311422 | A1* | 12/2010 | Jun et al. ...................... 455/436 |
| 2011/0090884 | A1* | 4/2011 | Won et al. ..................... 370/338 |

OTHER PUBLICATIONS

Lei Zhou et al., "Proposed Text for Initial Start Point for Enhanced LBS Support (16.8.3)", IEEE 802.16 Broadband Wireless Access Working Group, IEEE C802.16m-10/1106, Sep. 2010.

* cited by examiner

*Primary Examiner* — Kwasi Karikari
(74) *Attorney, Agent, or Firm* — Lee, Hong, Degerman, Kang & Waimey

(57) ABSTRACT

A method and a base station (BS) for transmitting a location measurement reference signal, and a method and a user equipment (UE) for receiving a location measurement reference signal are disclosed. The UE and the BS determine a transmission time of D-LBS zone configuration information configured to transmit an LBS location beacon on the basis of an S-SFH change cycle. In addition, the UE and the BS determine a transmission start point of the D-LBS zone transmitted according to the configuration information, using the transmission time of the configuration information.

14 Claims, 15 Drawing Sheets

METHOD AND BASE STATION FOR TRANSMITTING LOCATION MEASUREMENT REFERENCE SIGNAL, AND METHOD AND USER EQUIPMENT FOR RECEIVING LOCATION MEASUREMENT REFERENCE SIGNAL

CROSS-REFERENCE TO RELATED APPLICATIONS

Pursuant to 35 U.S.C. §119, this application claims the benefit of earlier filing date and right of priority to Korean Application No. 10-2011-0026262, filed on Mar. 24, 2011 and U.S. Provisional Patent Application Ser. No. 61/393,936, filed on Oct. 17, 2010, the contents of which are hereby incorporated by reference herein in their entirety.

BACKGROUND OF THE INVENTION

1. Field of the Invention

The present invention relates to a wireless communication system, and more particularly, to a method and an apparatus for transmitting reference signals at a base station (BS) for location based service in a wireless communication system, and a method and an apparatus for measuring a location of a user equipment (UE) by receiving the signals.

2. Discussion of the Related Art

Methods for measuring the location of a user equipment (UE) can be generally divided into two methods. The first method is a downlink (DL)-based location measurement method that measures the location of a user equipment (UE) on the basis of a DL signal transmitted from a base station (BS) to a user equipment (UE), and the second method is an uplink (UL)-based location measurement method that measures the location of a UE on the basis of a UL signal transmitted from the UE to the BS. In case of the DL-based location measurement, the UE receives DL signals from a plurality of cells, and measures location-associated parameters such as a time delay of the UL signals. In contrast, in case of the UL-based location measurement, the BS measures location-associated parameters such as a time delay of UL signals transmitted from the UE to the BS and neighbor BSs. That is, the UE geographical location can be calculated by measuring either a delay time of signals transmitted from several cells to the UE or a delay time of signals transmitted from the UE to several cells. Therefore, there are needed a plurality of signals to measure the UE location. Based on the above-mentioned description, although there are a variety of methods for calculating the UE location, a Time Difference of Arrival (TDOA) or Time Of Arrival (DOA) method has been generally used.

FIG. 1 is a conceptual view illustrating a downlink TDOA scheme for measuring a location of a user equipment.

Referring to FIG. 1, the downlink TDOA scheme is to measure a location of a user equipment by using the difference in timing of signals transmitted from respective cells to the user equipment. The user equipment measures a delay time of each signal received from each cell and reports the measured delay times to a serving cell or an anchor cell. The serving cell measures a location of the corresponding user equipment by using the reported delay times.

Meanwhile, in order to provide a communication service of high quality, the need of a location measurement scheme for determining a location of a user equipment within a network and/or locations of entities related to the user equipment more exactly has been increased. In this respect, an advanced method for determining a location while minimizing an effect on a structure of an existing radio frame should be provided.

SUMMARY OF THE INVENTION

Accordingly, the present invention is directed to a method and a base station (BS) for transmitting location measurement reference signal, and method and user equipment (UE) for receiving location measurement reference signal that substantially obviate one or more problems due to limitations and disadvantages of the related art.

An object of the present invention is to provide a method for transmitting a location measurement signal for location based service while minimizing an effect on a structure of an existing radio frame.

Another object of the present invention is to provide a method for allowing each cell to freely transmit a control signal of location measurement reference signal transmission.

A further object of the present invention is to provide a method for allowing a user equipment (UE) to correctly recognize a specific time at which each cell transmits a location measurement reference signal.

It is to be understood that technical objects to be achieved by the present invention are not limited to the aforementioned technical objects and other technical objects which are not mentioned will be apparent from the following description to the person with an ordinary skill in the art to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a location measurement reference signal for a location based service by a base station (BS) in a wireless communication system comprises: transmitting configuration information of a location measurement zone spanning one or more superframes to transmit the location measurement reference signal; and transmitting the location measurement zone starting from a superframe having a superframe number (SFN) satisfying the following equation, according to the configuration information, $$\mathrm{mod}(\mathrm{SFN}_{S\text{-}SFH(SP3)}+\text{D-LBS}_{ZP}-\mathrm{mod}(\mathrm{SFN}_{S\text{-}SFH(SP3)}, \text{D-LBS}_{ZP}), 2^{12}) \qquad \text{[Equation]}$$

where $\mathrm{SFN}_{S\text{-}SFH(SP3)}$ is the last superframe number in a secondary superframe header (S-SFH) change cycle including the configuration information, and $\text{D-LBS}_{ZP}$ indicates a transmission period of the location measurement zone.

In another aspect of the present invention, a method for receiving a location measurement reference signal for a location based service by a user equipment (UE) in a wireless communication system includes receiving configuration information of a location measurement zone spanning one or more superframes from a base station (BS); and receiving the location measurement zone starting from a superframe having a superframe number (SFN) satisfying the following equation, according to the configuration information, $$\mathrm{mod}(\mathrm{SFN}_{S\text{-}SFH(SP3)} + \text{D-LBS}_{ZP} - \mathrm{mod}(\mathrm{SFN}_{S\text{-}SFH(SP3)}, \text{D-LBS}_{ZP}), 2^{12})$$ [Equation]

where $\mathrm{SFN}_{S\text{-}SFH(SP3)}$ is the last superframe number contained in a secondary superframe header (S-SFH) change cycle including the configuration information, and $\text{D-LBS}_{ZP}$ indicates a transmission period of the location measurement zone.

In another aspect of the present invention, a base station (BS) for transmitting a location measurement reference signal for a location based service in a wireless communication system includes a transmitter; and a processor configured to control the transmitter, wherein the processor controls the transmitter to transmit configuration information of a location measurement zone spanning one or more superframes to transmit the location measurement reference signal, and transmits the location measurement zone starting from a superframe having a superframe number (SFN) satisfying the following equation, according to the configuration information, $$\mathrm{mod}(\mathrm{SFN}_{S\text{-}SFH(SP3)} + \text{D-LBS}_{ZP} - \mathrm{mod}(\mathrm{SFN}_{S\text{-}SFH(SP3)}, \text{D-LBS}_{ZP}), 2^{12})$$ [Equation]

where $\mathrm{SFN}_{S\text{-}SFH(SP3)}$ is the last superframe number in a secondary superframe header (S-SFH) change cycle including the configuration information, and $\text{D-LBS}_{ZP}$ indicates a transmission period of the location measurement zone.

In another aspect of the present invention, a user equipment (UE) for transmitting a location measurement reference signal for a location based service in a wireless communication system includes a receiver; and a processor configured to control the receiver, wherein the receiver is configured to receive configuration information of a location measurement zone spanning one or more superframes, and the processor controls the receiver to receive the location measurement zone starting from a superframe having a superframe number (SFN) satisfying the following equation, according to the configuration information, $$\mathrm{mod}(\mathrm{SFN}_{S\text{-}SFH(SP3)} + \text{D-LBS}_{ZP} - \mathrm{mod}(\mathrm{SFN}_{S\text{-}SFH(SP3)}, \text{D-LBS}_{ZP}), 2^{12})$$ [Equation]

where $\mathrm{SFN}_{S\text{-}SFH(SP3)}$ is the last superframe number contained in a secondary superframe header (S-SFH) change cycle including the configuration information, and $\text{D-LBS}_{ZP}$ indicates a transmission period of the location measurement zone.

The transmission information may include information indicating the transmission period of the location measurement zone.

The S-SFH change cycle may be a minimum duration in which contents of S-SFH remain same.

The UE may measure location-associated information determining the location of the user equipment (UE) using the location measurement reference signal received on the location measurement zone.

In each of the aspects of the present invention, the UE may transmit the location-associated information to the base station (BS). In addition, the base station (BS) may determine the location of the user equipment (UE) not only using location-associated information transmitted from the user equipment (UE) but also UE location-associated information shared with other base stations (BSs).

It is to be understood that both the foregoing general description and the following detailed description of the present invention are exemplary and explanatory and are intended to provide further explanation of the invention as claimed.

The aforementioned technical solutions are only a part of the embodiments of the present invention, and various modifications to which technical features of the present invention are applied could be understood by those of ordinary skill in the art to which the present invention pertains, based on the following detailed description of the present invention.

As is apparent from the above description, exemplary embodiments of the present invention have the following effects. The embodiments of the present invention can minimize influence of a legacy radio frame structure, and can transmit a location measurement reference signal for a location based service.

In addition, the embodiments of the present invention can reduce interference between cells participating in location measurement, thereby improving location measurement throughput of the UE on the basis of the location measurement reference signal.

According to the embodiments of the present invention, each cell can freely transmit information regarding transmission of the corresponding location measurement reference signal to the user equipment (UE).

According to the embodiments of the present invention, the UE and the BS can easily recognize time resources related to location measurement reference signal transmission.

It will be appreciated by those skilled in the art that the effects that could be achieved through the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
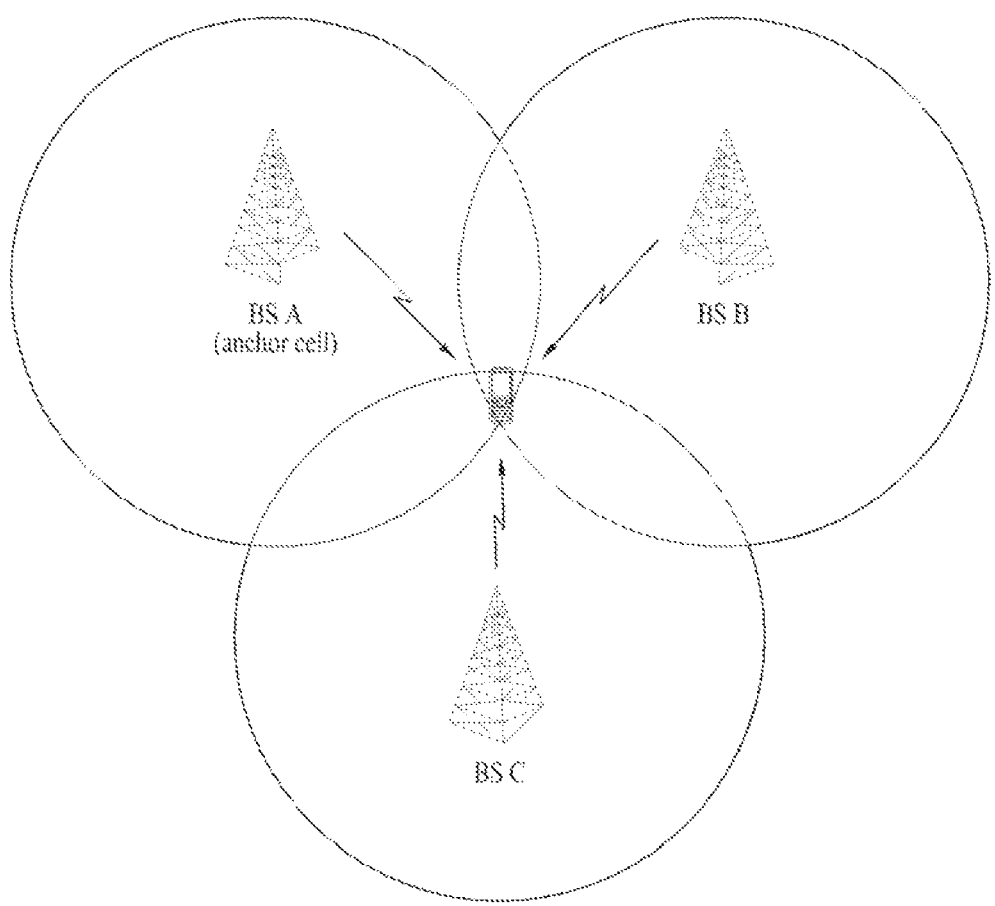
FIG. 1 is a conceptual diagram illustrating an observed time difference of arrival (OTDOA) method for measuring UE location.

Hereinafter, the preferred embodiments of the present invention will be described with reference to the accompanying drawings. It is to be understood that the detailed description, which will be disclosed along with the accompanying drawings, is intended to describe exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 system, the following description can be applied to other mobile communication systems excluding unique features of the IEEE 802.16 system.

In some cases, to prevent ambiguity in the concept of the present invention f, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) denotes a mobile or fixed type user terminal. Examples of the user equipment include various equipments that transmit and receive user data and/or various kinds of control information to and from a base station. The terminal equipment may be referred to as a terminal equipment (TE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

Meanwhile, in the present invention, the term 'cell' refers to a certain geographical area to which a BS or an antenna group provides a communication service in the present invention. Therefore, communication with a specific cell may be equivalent to communication with an antenna group that provides a communication service in the specific cell. A downlink/uplink signal in the specific cell is a downlink/uplink signal from or to the antenna group that provides a communication service in the specific cell. In addition, the channel state/quality of the specific cell is the channel state/quality of a channel or communication link established between the antenna group and a specific UE in a geographical area corresponding to the specific cell.

Hereinafter, LBS superframe/frame/subframe/symbol represents superframe/frame/subframe/symbol to which a reference signal for location based service (LBS) is allocated or can be allocated. The reference signal for LBS or LBS location measurement signal means a special waveform signal transmitted from a base station to a user equipment or from a user equipment to a base station for location specific measurement that enables more accurate location measurement. The base station (BS) according to the embodiments to be described later can signal allocation information of resources used for transmission of the special waveform to the user equipment (UE). The user equipment (UE) detects the special waveform transmitted according to the embodiments of the present invention, performs associated measurement, and reports the measurement result to the user equipment (UE).

Also, if a special signal within superframe/frame/subframe/symbol is not transmitted from its transmission location, it will be expressed that transmission of the special signal has been dropped, muted, null or blanked.

Meanwhile, in the present invention, if a certain signal is allocated to superframe/frame/subframe/symbol/carrier/subcarrier, it means that the certain signal is transmitted through the corresponding carrier/subcarrier during a period/timing of the corresponding superframe/frame/subframe/symbol.

As described in FIG. 1, in order to measure a location of a user equipment, signal transmission/arrival timing from each base station to the user equipment can be used. Examples of signals used for timing measurement include downlink pilot and advanced preamble (A-preamble) in a downlink, and also include uplink pilot and ranging channel in an uplink. A location based service using a DL signal is referred to as a DL LBS, and a location based service using a UL signal is referred to as a UL LBS.

A method for transmitting configuration information (or transmission information) of a location measurement DL signal, and the base station (BS) for implementing the same will hereinafter be described in detail. A method and base station (BS) for transmitting a location measurement DL signal according to the above-mentioned transmission information will hereinafter be described. In addition, a method and UE for receiving a location measurement DL signal on the basis of the transmission information are provided.

Figure 2:
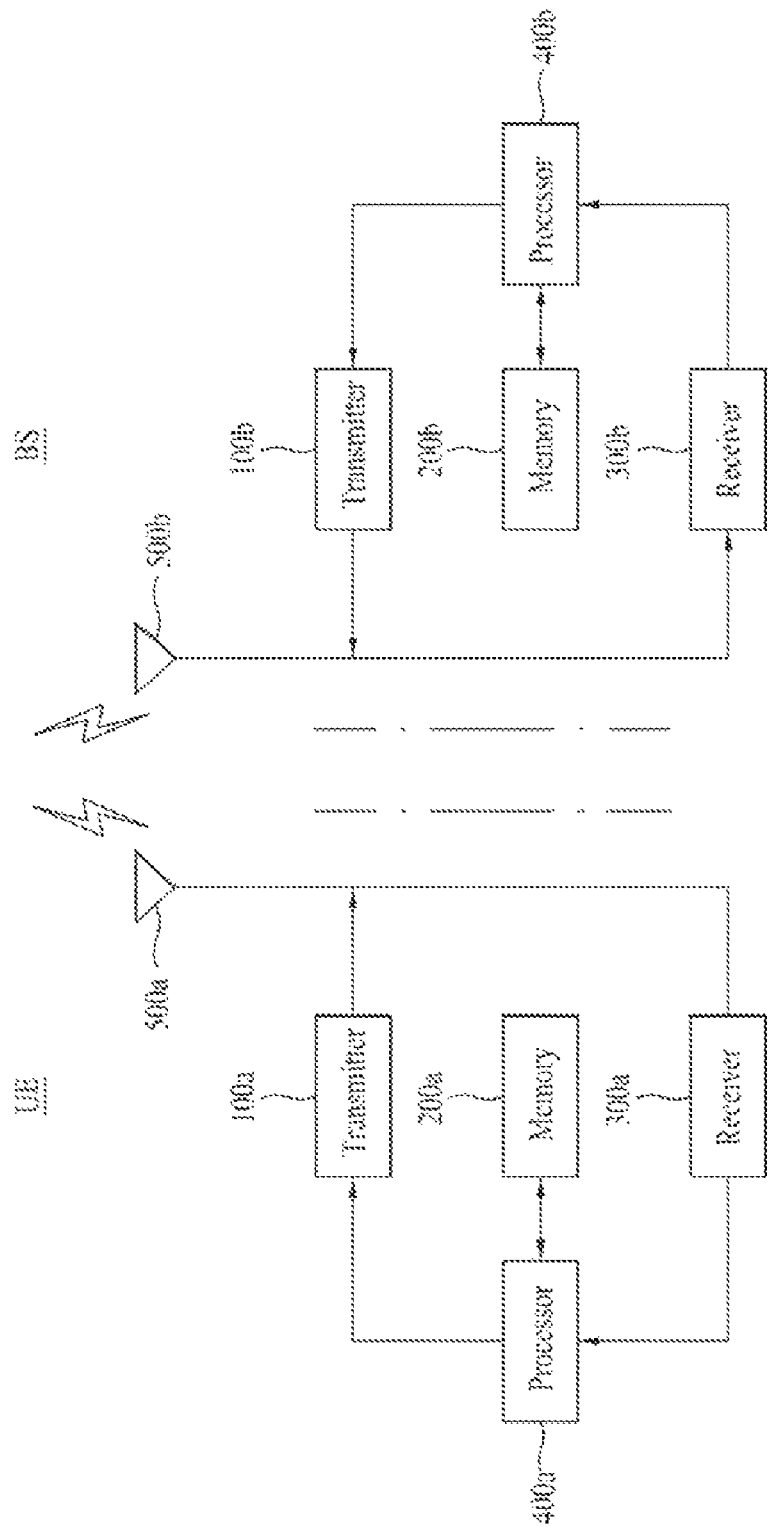
FIG. 2 is a block diagram of a user equipment (UE) and a base station (BS) for implementing an embodiment of the present invention according to an embodiment of the present invention.

FIG. 2 is a block diagram of a UE and a BS for implementing the present invention.

The UE serves as a transmitting device on the uplink and as a receiving device on the downlink. In contrast, the BS may serve as a receiving device on the uplink and as a transmitting device on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured of a combination of more than one physical antenna element. In either case, the signal transmitted from each antenna port is not designed to be further divided by the UE receiver 300a. The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements comprising the antenna port. That is, according to the antenna port of the embodiments of the present invention, a channel for transmitting a symbol on the antenna port may be derived from the channel to which a different symbol on the same antenna port is transmitted. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

In the meantime, the processor 400b in the BS may determine a superframe in which new or changed configuration information for a D-LBS zone is to be transmitted according to the embodiments of the present invention. The BS processor 400b may control the BS transmitter 100b to transmit the above-mentioned configuration information to the UE located at a cell managed by the BS in the determined superframe. The configuration information may include information indicating a transmission period of the D-LBS zone. In addition, the BS processor 400b may control the BS transmitter 100b in such a manner that a D-LBS zone is configured and transmitted according to the new or changed configuration information. The BS processor 400b may determine the transmission start timing of the D-LBS zone according to any one of the embodiments of the present invention. That is, the BS processor 400b may determine an initial start superframe of the D-LBS zone according to any one of the embodiments.

In addition, the BS processor 400b may determine the transmission start timing of new D-LBS zone configuration information in consideration of the longest S-SFH change cycle from among S-SFH change cycles of cells participating in LBS location measurement. For example, the BS processor 400b may determine the transmission start timing of the new DL-LBZ zone configuration information in such a manner that $SFN_{Initialstartpoint}$ of a specific cell of the BS is identical to $SFN_{Initialstartpoint}$ of a cell having the longest S-SFH change cycle from among cells participating in location measurement.

The UE processor 400a may determine which superframe contains an initial transmission position of the D-LBS zone on the basis of an application or reception time of the configuration information according to any one of the embodiments of the present invention. That is, the UE processor 400a may determine an initial start superframe ($SFN_{Initialstartpoint}$) of the D-LBS zone according to any one of the embodiments of the present invention. The UE processor 400a may determine whether the D-LBS zone is activated on the basis of the configuration information. The UE processor 400a may determine a transmission period of the D-LBS zone on the basis of the configuration information. The UE processor 400a may control the UE receiver 300a to receive the D-LBS zone on the basis of the configuration information. The UE receiver 300a may receive or detect a location measurement reference signal transmitted on the D-LBS zone under the control of the UE processor 400a.

The UE processor 400a may measure location-associated parameters of a BS having transmitted the location measurement reference signal, using the location measurement reference signal and DL LBS location measurement reference signals that are transmitted not only from a BS of a cell (hereinafter referred to as a serving cell) including the UE but also from BSs of neighbor cells participating in LBS location measurement. For example, a Relative Delay (RD), a Round Trip Delay (RTD), a Received Signal Strength Indication (RSSI), etc. may be measured as the above-mentioned location-associated parameters. The UE receiver 300a may receive location measurement reference signals from several cells in a superframe belonging to the D-LBS zone, and may calculate location-associated parameters using the location measurement reference signals. The UE processor 400a or the UE receiver 300a may be configured to include a separate module for measuring or calculating UE location-associated parameters using the location measurement reference signals. The UE processor 400a may control the UE transmitter 100a in such a manner that the location-associated parameters are transmitted to a BS of the serving cell. The BS processor 400b contained in the BS of the serving cell may determine the UE location using location-associated parameters transmitted from the UE and other location-associated parameters of a neighbor cell.

On the other hand, the UE processor 400a may directly determine the UE location using the location measurement reference signals. The UE processor 400a may control the UE transmitter 100a to transmit information of the determined location to the BS. The UE processor 400a or the UE receiver 300a may be configured to include a separate module for determining the UE location using the location measurement reference signals.

Figure 3:
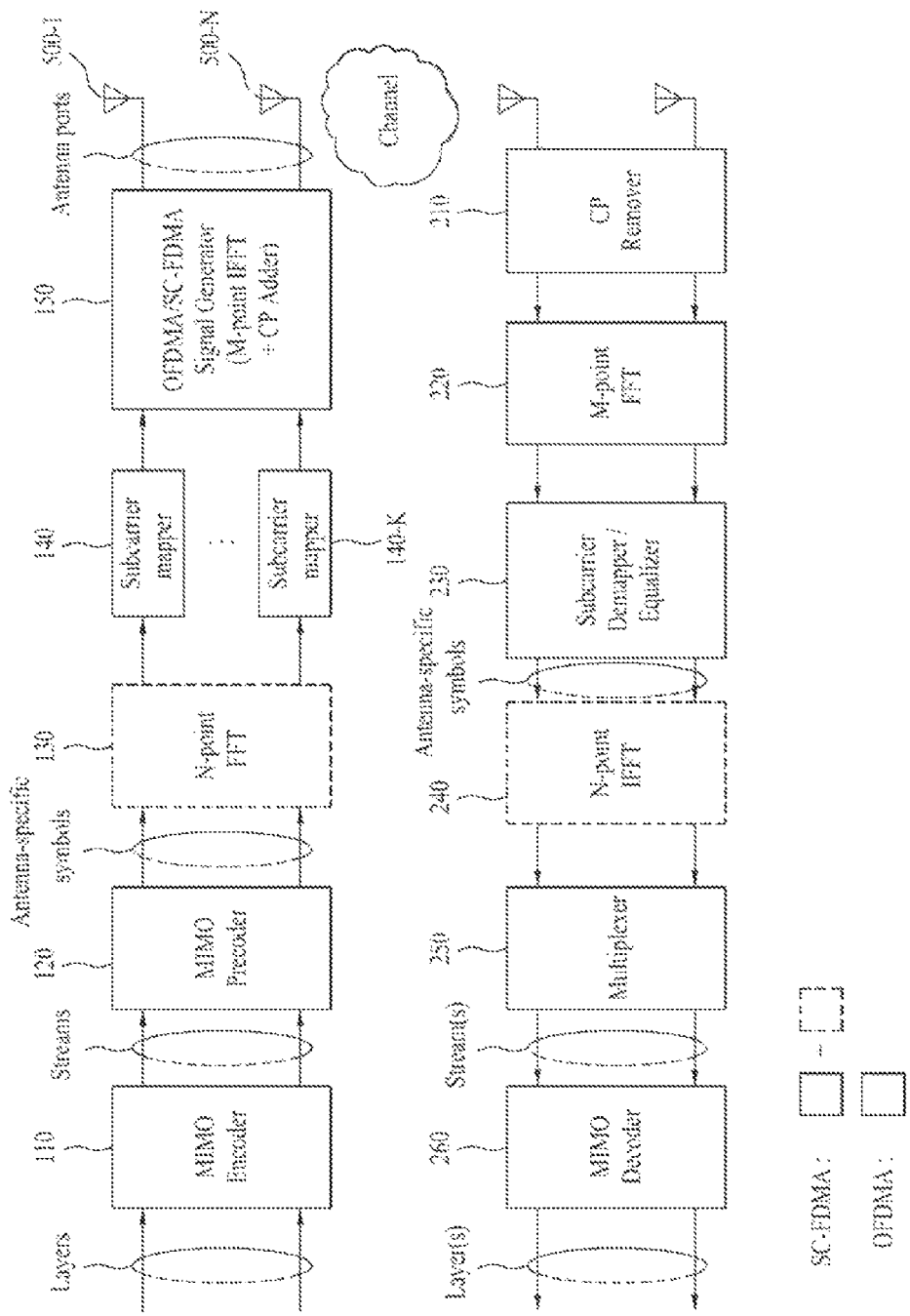
FIG. 3 is a block diagram of an exemplary transmitter in each of a user equipment (UE) and a base station (BS)

FIG. 3 is a block diagram of an exemplary transmitter in each of the UE and the BS. Operations of the transmitters 100a and 100b will be described below in more detail with reference to FIG. 3.

Referring to FIG. 3, each of the Orthogonal Frequency Division Multiple Access (OFDMA) transmitters 100a and 100b includes a MIMO encoder 110, a MIMO precoder 120, subcarrier mappers 140-1 to 140-K, and an OFDMA signal generator(s) 150. Each of the transmitters 100a and 100b is connected to $N_t$ transmission antennas 500-1 to 500-$N_t$.

The MIMO encoder 110 encodes a transmission data stream in accordance with a predetermined coding scheme to form coded data and modulates the coded data to be arranged as symbols representing positions on a signal constellation in a predetermined modulation scheme. The transmission data stream input to the MIMO encoder 110 may be generated by subjecting a data block received from a MAC layer to various signal processes such as channel encoding, interleaving, and scrambling. The data stream may be referred to as a codeword or a layer and is equivalent to a data block from the MAC layer. The data block from the MAC layer is referred to as a transport block. The modulation scheme may be, but not limited to, any of m-Phase Shift Keying (m-PSK) and m-Quadrature Amplitude Modulation (m-QAM). For modulating the coded data, the MIMO encoder 110 may have an independent modulation module. In the mean time, the MIMO encoder 110 may define MIMO streams of the input symbols such that the MIMO precoder 120 can distribute antenna-specific symbols to corresponding antenna paths. A MIMO stream refers to an information path input to the MIMO precoder 120, and the information path before the MIMO precoder 120 may be referred to as a virtual antenna or a MIMO stream. To define the MIMO streams of the symbols, the MIMO encoder 110 may be provided with a MIMO stream mapper configured as an independent module.

The MIMO precoder 120 outputs antenna-specific symbols to the subcarrier mappers 140-1 to 140-K by processing the received symbols in accordance with a MIMO scheme according to the multiple transmission antennas 500-1 to 500-$N_t$. Mapping of the MIMO streams to the antennas 500-1 to 500-Nt is performed by the MIMO precoder 120. Specifically, the MIMO precoder 120 multiplies the output x of the MIMO encoder 110 by an $N_r \times M_t$ precoding matrix W. The output of the MIMO precoder 120 may be represented as an $N_r \times N_F$ matrix z.

The subcarrier mappers 140-1 to 140-K allocate the antenna-specific symbols to appropriate subcarriers and multiplex them according to UEs. In the meantime, the subcarrier mappers 140-1 to 140-K may include a Logical Resource Unit (LRU) allocation block (not shown) for dividing the modulated symbols into LRU sized segments and allocating each segment to the LRU. The subcarrier mappers 140-1 to 140-K can include a mapping block (not shown) for mapping the LRU into burst data. The data burst is allocated to a Physical Resource Unit (PRU) in a physical frequency domain. Accordingly, the subcarrier mappers 140-1 to 140-K serve to map the modulated data into subcarriers in accordance with a mapping relation between the LRU and the PRU.

The OFDMA signal generator(s) 150 output OFDM symbols by modulating the antenna-specific symbols according to an OFDM modulation scheme. For example, the OFDMA signal generators 150 may perform Inverse Fast Fourier Transform (IFFT) for the antenna-specific symbols and insert a Cyclic Prefix (CP) into the resulting IFFT time-domain symbol. After digital-to-analog conversion and frequency upconversion, the OFDMA symbol is transmitted to the receiver through the transmission antennas 500-1 to 500-Nt. The OFDMA signal generator 150 may include an IFFT module, a CP inserter, a Digital-to-Analog Converter (DAC), and a frequency upconverter.

The OFDMA receivers 300a and 300b process signals in reverse to the operation of the OFDMA transmitters.

More specifically, the receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module. More specifically, the signal recoverer may include an Analog-to-Digital Converter (ADC) for converting an analog signal to a digital signal, a CP remover 210 for removing a CP from the digital signal, a Fast Fourier Transform (FFT) module 220 for generating frequency symbols by applying FFT to the CP-removed signal, and a subcarrier demapper/equalizer 230 for recovering the frequency symbols to antenna-specific symbols. A multiplexer 250 recovers MIMO streams from the antenna-specific symbols and a MIMO decoder 260 recovers the data streams transmitted by the transmitting apparatus from the MIMO streams.

Compared to the OFDMA transmitter, a Single Carrier Frequency Division Multiple Access (SC-FDMA) transmitter further includes an FFT module 130 before the subcarrier mappers 140 to 140-K. The SC-FDMA transmitter may significantly reduce Peak-to-Average Power Ratio (PAPR) by spreading a plurality of data in the frequency domain through FFT before IFFT is performed, relative to the OFDMA scheme. An SC-FDMA receiver further includes an IFFT module 240 after the subcarrier demapper/equalizer 230 in addition to the components of the OFDMA receiver. The SC-FDMA receiver processes a signal in reverse to the operation of the SC-FDMA transmitter.

Although it has been described in FIG. 2 and FIG. 3 that each of the transmitters 110a and 100b includes the MIMO encoder 110, the MIMO precoder 120, the subcarrier mappers 140-1 to 140-K, and the OFDMA/SC-FDMA signal generators 150, the processors 400a and 400b of the transmitter may include the MIMO encoder 110, the MIMO precoder 120, the subcarrier mappers 140-1 to 140-K, and the OFDMA/SC-FDMA signal generators 150. Likewise, although it has been described in FIG. 2 and FIG. 3 that each of the receivers 300a and 300b includes the signal recoverer, the multiplexer, and the channel demodulator, the processors 400a and 400b of the receiver may include the signal recoverer, the multiplexer, and the channel demodulator. Hereinafter, for convenience of description, the MIMO encoder 110, the MIMO precoder 120, the subcarrier mappers 140-1 to 140-K, and the OFDMA/SC-FDMA signal generators 150 are included in the transmitters 100a and 100b separated from the processors 400a and 400b that control the operations of the MIMO encoder 110, the MIMO precoder 120, the subcarrier mappers 140-1 to 140-K, and the OFDMA/SC-FDMA signal generators 150. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the MIMO encoder 110, the MIMO precoder 120, the subcarrier mappers 140-1 to 140-K, and the OFDMA/SC-FDMA signal generators 150 are included in the processors 400a and 400b and the case where the signal recoverer, the multiplexer, and the channel demodulator are included in the processors 400a and 400b.

Figure 4:
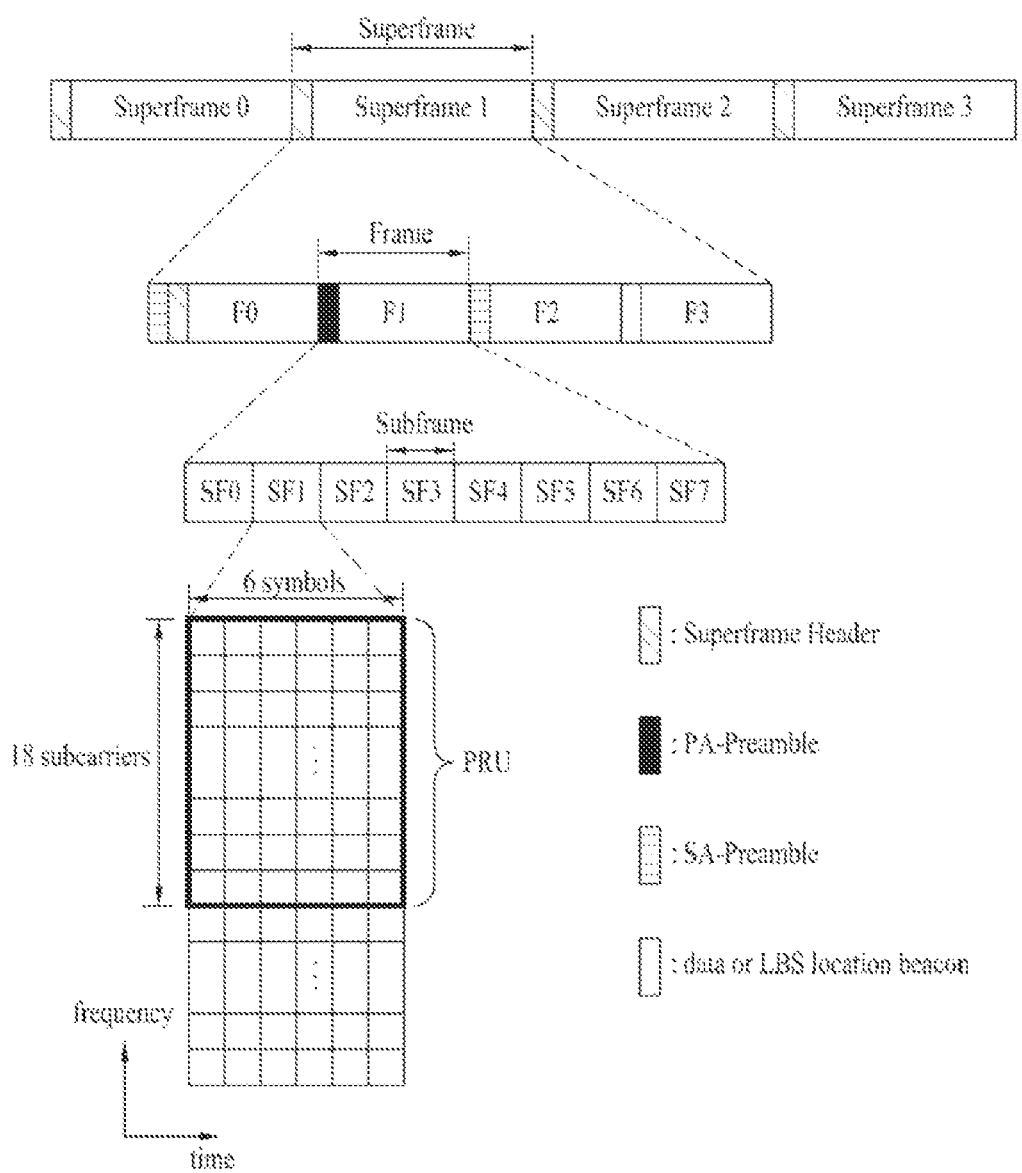
FIG. 4 illustrates an exemplary structure of a radio frame of IEEE 802.16m according to an embodiment of the present invention.

FIG. 4 illustrates an exemplary structure of a radio frame of IEEE 802.16m used in the wireless communication system. The radio frame structure can be applied to a Frequency Division Duplex (FDD) mode, a Half Frequency Division Duplex (H-FDD) mode, and a Time Division Duplex (TDD) mode.

Referring to FIG. 4, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size.

One frame can include a certain number of subframes. For a 5/10/20 MHz system bandwidth, one frame may include eight subframes SF0 to SF7. For an 8.75 MHz system bandwidth, one subframe may include seven subframes SF0 to SF6. For a 7 MHz system bandwidth, one subframe may include six subframes SF0 to SF5. The subframe is allocated for downlink or uplink transmission. The frame can be configured differently depending on duplex modes. For example, since downlink transmission and uplink transmission are identified by frequency in the FDD mode, one frame includes either downlink subframes or uplink subframes. In the FDD mode, for the system bandwidth of 5/10/20 MHz, the eight subframes of each frame are numbered from 0 to 7. An idle time can exist at the end of each frame. On the other hand, since downlink transmission and uplink transmission are identified by time in the TDD mode, subframes within the frame are classified into downlink subframes and uplink subframes. For a system bandwidth of 5/10/20 MHz, for example, n downlink subframes out of eight subframes are indexed from 0 to n−1 and the remaining (8-n) uplink subframes are indexed from 0 to (8-n)−1 in each frame.

A subframe is a unit of a Transmission Time Interval (TTI). In other words, one TTI is defined by one or more subframes. In general, a basic TTI is set to one subframe. The TTI means a time interval during which a physical layer transmits coded packets through a radio interface. Accordingly, one subframe or a plurality of neighboring subframes can be used for transmission of data packets.

A subframe includes a plurality of OFDMA symbols in the time domain and a plurality of subcarriers in the frequency domain. The OFDMA symbols may be referred to as OFDMA symbols or SC-FDMA symbols depending on a multiplexing access scheme. The number of OFDMA symbols in a subframe may vary depending on a channel bandwidth and a CP length. The type of a subframe can be identified depending on the number of OFDMA symbols included in the subframe. For example, subframe type-1 includes six OFDMA symbols, subframe type-2 includes seven OFDMA symbols, subframe type-3 includes five OFDMA symbols, and subframe type-4 includes nine OFDMA symbols. A frame may include one type of subframes or different types of subframes. For the convenience' sake of description, the embodiments of the present invention will be described in the context of subframe type-1 including six OFDM symbols. However, it is to be noted that the embodiments of the present invention, which will be described later, are also applicable to the other types of subframes in the same manner.

In the frequency domain, an OFDMA symbol includes a plurality of subcarriers and the number of subcarriers is determined according to the size of FFT. The subcarriers may be classified into data subcarriers for data transmission, pilot subcarriers for channel estimation, and null subcarriers for a guard band and a DC component. Parameters for the OFDMA symbols include, for example, BW, $N_{used}$, n, G, etc. The BW is a nominal channel bandwidth. $N_{used}$ is the number of subcarriers used for signal transmission. Also, n is a sampling factor that determines a subcarrier spacing and a useful symbol time together with BW and $N_{used}$. G is the ratio of a useful symbol time to a CP time.

In the frequency domain, resources can be grouped in a predetermined number of subcarriers. A group including a predetermined number of subcarriers within one subframe is referred to as a Resource Unit (RU). An RU is a basic unit of resource allocation. A basic resource allocation unit in a logical frequency domain is referred to as a Logical Resource Unit (LRU) and a basic resource allocation unit in a physical frequency domain is referred to as a Physical Resource Unit (PRU). PRUs are mapped to LRUs by frequency permutation.

A subframe includes a plurality of PRUs in the frequency domain. Each PRU includes a plurality of consecutive OFDMA symbols in the time domain and a plurality of consecutive subcarriers in the frequency domain. For example, the number of OFDMA symbols $N_{sym}$ in the PRU may be equal to the number of OFDMA symbols included in the subframe. In the mean time, the number of subcarriers within the PRU may be 18. In this case, the PRU of the type-1 subframe includes 6 OFDM symbols×18 subcarriers.

The aforementioned structure is only exemplary. Accordingly, various modifications can be made to the length of a superframe, the number of subframes included in the superframe, the number of OFDMA symbols included in a subframe, and parameters of OFDMA symbols. For example, the number of subframes included in a frame may vary depending on the channel bandwidth and the CP length.

Each superframe contains a SuperFrame Header (SFH). The SFH can be located in the first subframe within a superframe and use the last 5 OFDM symbols which form a type-3 subframe within the first subframe. The SFH carries essential system parameters and system configuration information. The SFH can be classified into a Primary SFH (P-SFH) and a Secondary SFH (S-SFH). The P-SFH is transmitted per superframe. S-SFH may be divided into three subpackets (S-SFH SP1, S-SFH SP2, and S-SFH SP3). The subpackets (hereinafter referred to as S-SFH SPs) of the S-SFH may be periodically transmitted. Individual subpackets may have different transmission periods. For example, S-SFH SPs may have the following transmission periods.

TABLE 1

| SP scheduling periodicity information | Transmission periodicity of S-SFH SP1 | Transmission periodicity of S-SFH SP2 | Transmission periodicity of S-SFH SP3 |
|---|---|---|---|
| 0000 | 40 ms | 80 ms | 160 ms |
| 0001 | 40 ms | 80 ms | 320 ms |
| 0010-1111: reserved | | | |

In Table 1, SP scheduling period information may represent transmission periods of S-SFH SPs, and at least one (e.g., SP3) of P-SFH, S-SFH SP1, S-SFH SP2, and S-SFH SP3 may carry the above-mentioned SP scheduling period information.

One superframe carries up to four downlink synchronization signals. A downlink synchronization signal is used for downlink synchronization. In an IEEE 802.16m system, for example, a downlink synchronization signal includes a primary synchronization signal with a Primary Advanced preamble (PA-preamble) and a secondary synchronization signal with a Secondary Advanced preamble (SA-preamble). Each of the PA-preamble, the SA-preamble, and a DL LBS location beacon is located in the first symbol of a frame in the FDD mode and the TDD mode. The PA-preamble delivers information about a system bandwidth and a carrier configuration. Thus a UE may acquire the system bandwidth and carrier configuration information from the PA-preamble. The SA-preamble carries a cell Identifier (ID) of a BS. The SA-preamble is located at the first symbols of the first and third frames in a superframe, thus can be accumulated twice. A UE may detect the cell ID of the BS or perform cell scanning during handover, using the SA-preamble twice transmitted in one superframe.

On the other hand, in order to minimize the influence of a LBS location beacon upon a system, the LBS location beacon is transmitted only in a predetermined number of superframes but not every superframe. Hereinafter, an interval in which the BS transmits an LBS location measurement reference signal to UEs located in one cell is referred to as a DL LBS zone (also called a D-LBS zone). That is, the D-LBS zone is defined to transmit an LBS location beacon received by the UE. The D-LBS zone according to the embodiments of the present invention allows location-associated parameters (RD, RTD, RSSI, etc.) to be measured with higher accuracy.

The present invention includes one embodiment in which a D-LBS zone spans one superframe and the other embodiment in which the D-LBS zone spans of a plurality of consecutive superframes. In addition, the present invention may also include one embodiment in which the number of superframes constructing the D-LBS zone is fixed and the other embodiment in which the number of superframes constructing the D-LBZ zone is not fixed. In the case where the number of superframes constructing the D-LBS zone is not fixed, the BS may signals the number of superframes constructing the LBS zone to the UE through a MAC control message, a PA-preamble or SFH. Even in the case where the number of superframes constructing the D-LBS zone is fixed, information regarding the number of superframes belonging to the D-LBS zone may be signaled to the UE through an MAC control message, SFH and a PA-preamble, etc. The BS processor 400b may generate an MAC control message, SFH or a PA-preamble including information regarding the number of superframes forming the D-LBS zone. For convenience of description and better understanding of the present invention, the embodiments of the present invention will hereinafter be described using the case including a fixed number of superframes spanned by the D-LBS zone as an example.

Figure 5:
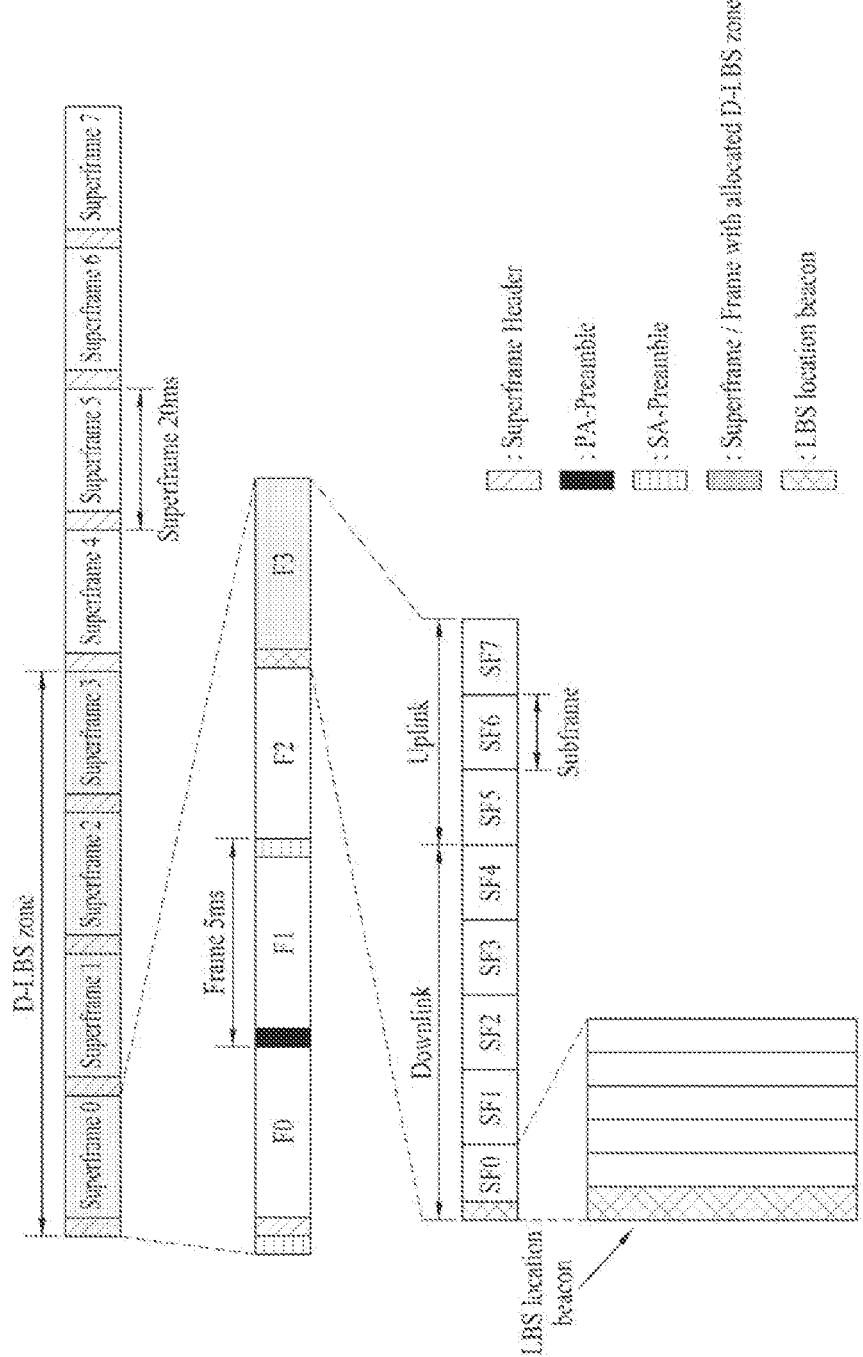
FIG. 5 is an example of allocation of a D-LBS zone.

FIG. 5 is an example of allocation of a D-LBS zone.

Referring to FIG. 5, one D-LBS zone spans one or more superframes (e.g., 4 superframes). If the D-LBS zone is activated, a first OFDMA symbol of a first DL subframe of the last frame of each superframe contained in the D-LBS zone is used for LBS location beacon transmission. In the case of a Type-1 subframe, the remaining 5 consecutive OFDMA symbols other than the first OFDM symbol in which an LBS location beacon is transmitted construct a Type-3 subframe. In the case of a Type-2 subframe, if a MIMO midamble and an LBS location beacon are transmitted in one subframe, five consecutive OFDMA symbols between the MIMO midamble and the LBS location beacon form a Type-3 subframe.

Referring to FIG. 5, a PA-preamble is located at a first symbol of a second frame (F1) in a superframe, and an SA-preamble is located at a first symbol of each of the remaining two frames (F0 and F2) of the superframe. In the case where the superframe is a location measurement superframe for a DL LBS, the LBS location beacon is transmitted in the last frame F3 of the superframe, but otherwise data signal is transmitted in the last frame F3 of the superframe.

If the UE performs location measurement using LBS location beacon signals transmitted from several cells, the UE has difficulty in detecting signals from neighbor cell(s) other than a serving cell due to hearability problem, near-far effect, etc. In this case, in order to reduce interference transmitted from neighbor cells to the UE, the BS of the serving cell may temporarily stop DL transmission of the serving cell. Alternatively, the BS of the serving cell may schedule LBS location beacon transmission of the serving cell in such a manner that LBS location beacon signal of the serving cell are transmitted using time and/or frequency resources of a predetermined pattern in which the LBS location beacon signal of the serving cell is orthogonal to LBS location beacon signal(s) of neighbor cell(s). In other words, the BS of the serving cell may transmit the LBS location beacon using one of orthogonal transmission patterns. In this way, the LBS location beacon transmission scheduled in a predetermined pattern may be applied to each D-LBS zone. Each BS participating in LBS location measurement may cell-specifically determine a transmission pattern for LBS location beacon transmission.

D-LBS zone configuration information for controlling D-LBS zone activation and/or a D-LBS zone transmission period may be transmitted to the UE through an SFH. The activated D-LBS zone may be periodically transmitted prior to application of new D-LBS zone configuration information, deactivation of the activated D-LBS zone, or a hand-off time of a UE. For example, the D-LBS zone configuration information shown in Table 2 may be transmitted to the UE through an SFH.

TABLE 2

| D-LBS zone configuration | D-LBS zone transmission period |
|---|---|
| 0b00 | D-LBS zone transmission is switched off |
| 0b01 | D-LBS zone periodicity = 4 superframes (80 ms) |
| 0b10 | D-LBS zone periodicity = 16 superframes (320 ms) |
| 0b11 | D-LBS zone periodicity = 32 superframes (640 ms) |

Figure 6:
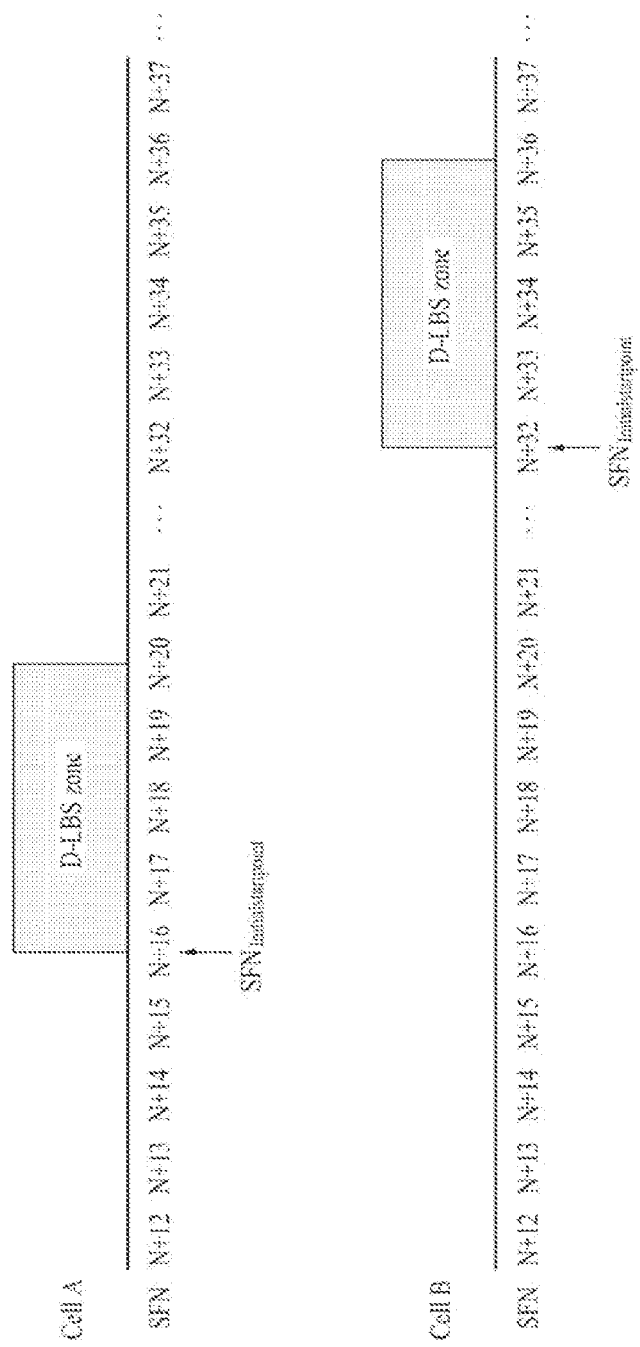
FIGS. 6 and 7 exemplarily show the problems encountered when cells participating in location measurement for LBS starts initial transmission of a D-LBS zone at different time points.
Figure 7:
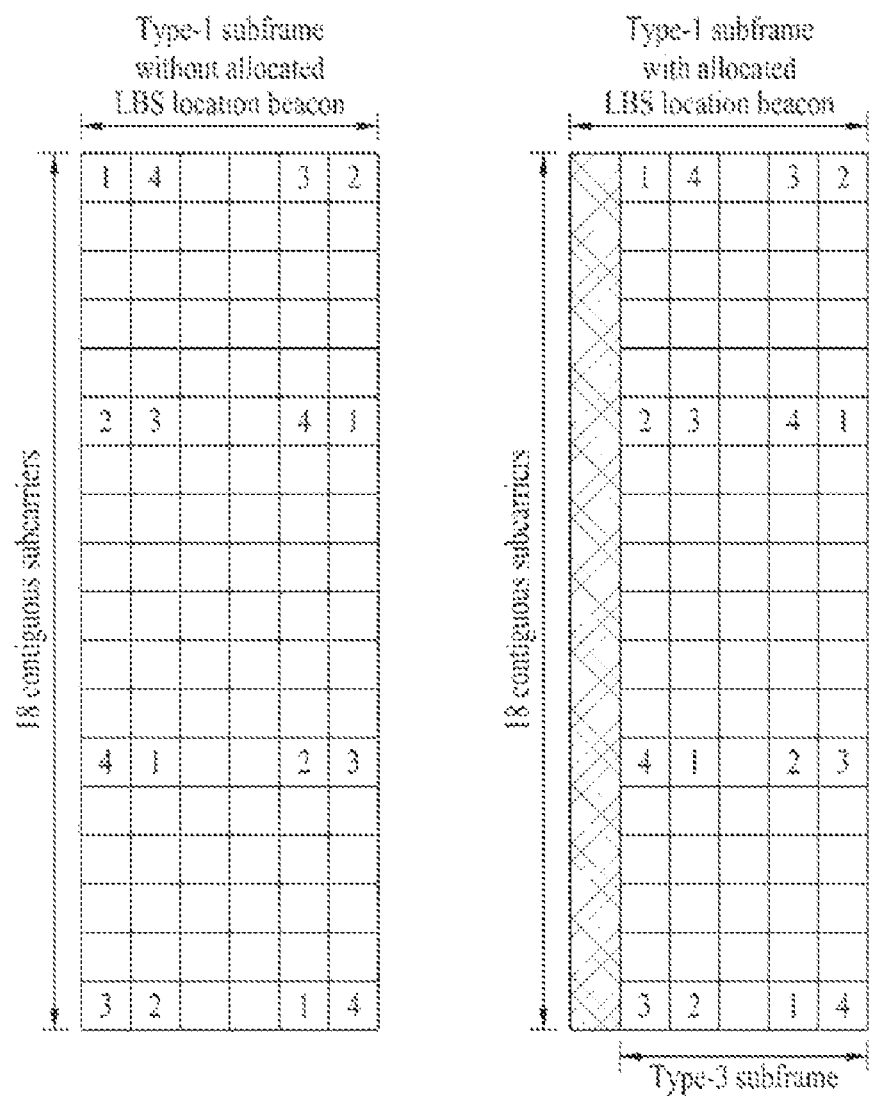

FIGS. 6 and 7 exemplarily show the problems encountered when cells participating in location measurement for LBS starts initial transmission of a D-LBS zone at different time points. Specifically, FIG. 7 exemplarily shows a pilot pattern for 4 data streams in a general Type-1 subframe and another pilot pattern for 4 data streams in a Type-1 subframe including an LBS location beacon. The left one in FIG. 7 shows a Type-1 subframe pilot pattern having no LBS location beacon, and the right one in FIG. 7 shows a Type-1 subframe pilot pattern having an LBS location beacon. Hereinafter, a superframe having a superframe number (SFN) 'i' is called a superframe i for convenience of description and better understanding of the present invention.

When periodically transmitting a D-LBS zone, it is preferable that a transmission start position of the D-LBS zone is the same in cells participating in LBS location measurement. Although BSs participating in LBS location measurement negotiate with each other to construct a D-LBS zone and each BS can recognize D-LBS zone arranged by neighbor BSs, the UE has difficulty in recognizing D-LBS zone information negotiated by the BSs unless there are predefined information or rules. That is, the UE has difficulty in recognizing superframes in which the D-LBS zones of neighbor cells are transmitted, on the basis of D-LBS zone configuration information transmitted from the BS of the serving cell to the UE, although the UE can recognize superframes in which a D-LBS zone of the serving cell is transmitted. If the UE wrongly recognizes a superframe in which a D-LBS zone of a neighbor cell is transmitted, LBS measurement throughput or performance may be deteriorated.

Referring to FIG. 6, a BS of a cell A (hereinafter referred to as 'BS A') transmits a D-LBS zone for the cell A starting from SFN N+16 to the UE located at the cell A (hereinafter referred to as 'UE A'). The BS participating in LBS location measurement may cell-specifically configure an LBS location measurement beacon transmission pattern for a specific cell managed by the BS, and transmits a first D-LBS zone of which first superframe is a superframe N+16 carrying the LBS location beacon. That is, the superframe N+16 is an initial superframe spanned by the first D-LBS zone. A first superframe contained in a D-LBS zone that is initially transmitted according to specific D-LBS zone configuration information is called an initial start superframe, and a superframe number (SFN) of the initial start superframe is called an $SFN_{Initial-startpoint}$. The BS A may transmit pilots based on a Type-3 subframe pilot pattern within an LBS subframe to which an LBS location beacon is allocated from among subframes contained in the D-LBS zone for the cell A. When transmitting four data streams, the BS A may transmit the LBS location beacon at a first OFDMA symbol, and may transmit a pilot pattern (e.g., the pilot pattern shown in the right one of FIG. 7) along with the four data streams at the remaining 5 OFDMA symbols.

On the other hand, a BS of a cell B (hereinafter referred to as 'BS B') participating in location measurement in the same manner as in the cell A transmits a D-LBS zone for the cell B in the range from a superframe N+32 to the UE located at the cell B (hereinafter referred to as 'UE B'). In the range of superframes N+16 to N+19 during which the BS A transmits an LBS location beacon, the BS B may transmit usual user data to the UE B. When transmitting four data streams, the BS B may transmit a pilot pattern (shown in the left one of FIG. 7) along with the four data streams in each subframe of the superframes N+16 to N+19.

In this case, in the superframes N+16 to N+19, the UE B may receive the LBS location beacon of the cell A and a Type-3 subframe pilot pattern from the BS A simultaneously while receiving data, and may receive a Type-1 subframe pilot pattern and data from the BS B. In this case, the UE B may attempt to decode data received in the superframes N+16 to N+19 using a pilot pattern of a general Type-1 subframe, since from the standpoint of the UE B, superframes N+16 to N+19 are not in a D-LBS zone. Generally, the LBS location beacon may be transmitted with power boosted for measurement accuracy. Therefore, in the superframes N+16 to N+19, the UE B may receive the LBS location beacon of the cell A along with data transmitted from the BS B at a relatively strong intensity. It is impossible for the UE B to recognize that BS A transmits an LBS location beacon at a first symbol of the Type-1 subframe, and different types of pilots are transmitted with data in the remaining 5 symbols of the Type-1 subframe, resulting in performance deterioration of the UE B. The reason why the UE B performance deterioration occurs is that there is interference caused by the LBS location beacon that is transmitted from the cell A at high transmission power. In addition, pilot transmission for two data streams may use an interlaced pilot pattern. When using the interlaced pilot pattern, the UE will attempt to decode data using other types of pilots in the remaining 5 symbols, so that the interlaced pilot pattern is broken and it is impossible for data to be correctly decoded.

In addition, if the D-LBS zone is not arranged between cells, it is difficult for each cell to transmit the LBS location beacon on one transmission pattern that is cell-specifically determined from among orthogonal transmission patterns.

In this way, the problems occurred when D-LBS zones from cells (hereinafter referred to as cooperative cells) participating in LBS location measurement are not arranged may be considerably solved under the condition that the cooperative cells starts transmissions of the D-LBS zone at the same time. D-LBS zone configuration information may be utilized in such a manner that D-LBS zones transmitted from cooperative cells can be arranged. The following description assumes that D-LBS zone configuration information is transmitted through S-SFH SP3, and embodiments of the present invention will hereinafter be described. However, although D-LBS zone configuration information is transmitted over different broadcast channels, the embodiments of the present invention may also be applied in the same manner as described above. In the case where S-SFH SP3 carries D-LBS zone configuration information, the D-LBS zone may be activated by S-SFH SP3 or a transmission period of the D-LBS zone may be changed. The embodiments in which cooperative cells are arranged with other cooperative cells so as to transmit the D-LBS zone will hereinafter be described with reference to FIGS. 8 to 15.

The BS transmits D-LBS zone configuration information, so that it may inform the UE that the D-LBS zone will be transmitted. The UE receives D-LBS configuration information, whereby the UE can recognize that the BS configures a D-LBS zone newly or changes a D-LBS zone. BSs of cells participating in the LBS negotiate with one another about activation/deactivation time of the D-LBS zone and also negotiate with one another about which period is used for D-LBS zone transmission, whereby generate D-LBS zone configuration information. Unless cooperative cells have the same D-LBS zone configuration information, the UE cannot recognize D-LBS zone configuration information of other cooperative cells only using D-LBS zone configuration information of the serving cell. However, provided that the D-LBS zone is configured, each cooperative cell transmits D-LBS zone configuration information to the UE of the corresponding cell so as to inform the UE of D-LBS zone configuration, such that the UE receives the D-LBS zone configuration information in such a manner that the UE may recognize that a D-LBS zone carrying an LBS location beacon will be transmitted after lapse of a predetermined time. Accordingly, the BS according to the embodiments of the present invention controls a transmission time point of the D-LBS zone configuration information such that D-LBS zone transmission between cooperative cells is arranged.

The embodiments for arranging D-LBS zone transmission may be generally classified into two methods (Method 1 and Method 2). In Method 1, a timing point at which new or changed D-LBS zone configuration information can be transmitted is fixed between cooperative cells or predefined cells. Method 2 provides rules in which the D-LBS zone can be arranged although cooperative cells can freely transmit D-LBS zone configuration information.

Method 1: Fixed Transmission Time and Period for S-SFH SP3

First Embodiment

Figure 8:
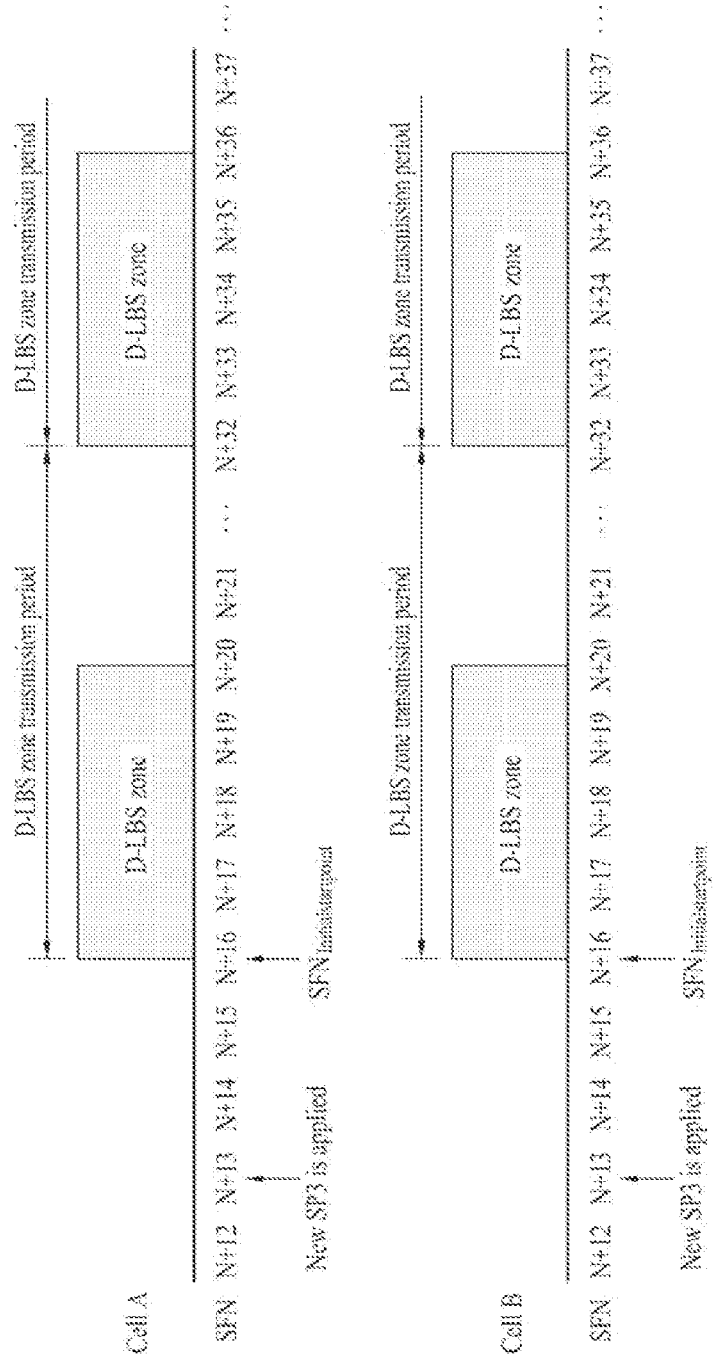
FIG. 8 is a conceptual diagram illustrating a method for arranging a D-LBS zone according to a first embodiment of the present invention.

FIG. 8 is a conceptual diagram illustrating a method for arranging a D-LBS zone according to a first embodiment of the present invention.

For example, an initial start superframe for D-LBS zone transmission using S-SFH SP3 may be determined using the following equation 1.

$$SFN_{Initialstartpoint} = mod(SFN_{S\text{-}SFH(SP3)} + D\text{-}LBS_{ZP} - mod(SFN_{S\text{-}SFH(SP3)}, D\text{-}LBS_{ZP}), 2^{12})$$ [Equation 1]

In Equation 1, $SFN_{Initialstartpoint}$ means a superframe number (SFN) of a superframe (i.e., an initial start superframe) corresponding to a D-LBS zone initial start point, $SFN_{S\text{-}SFH(SP3)}$ means an SFN of a superframe to which UE applies a changed S-SFH SP3 (hereinafter referred to as 'new S-SFH SP3) having initial or changed period information of the D-LBS zone according to the S-SFH update procedure, and $D\text{-}LBS_{ZP}$ means the period of the D-LBS zone.

Figure 9:
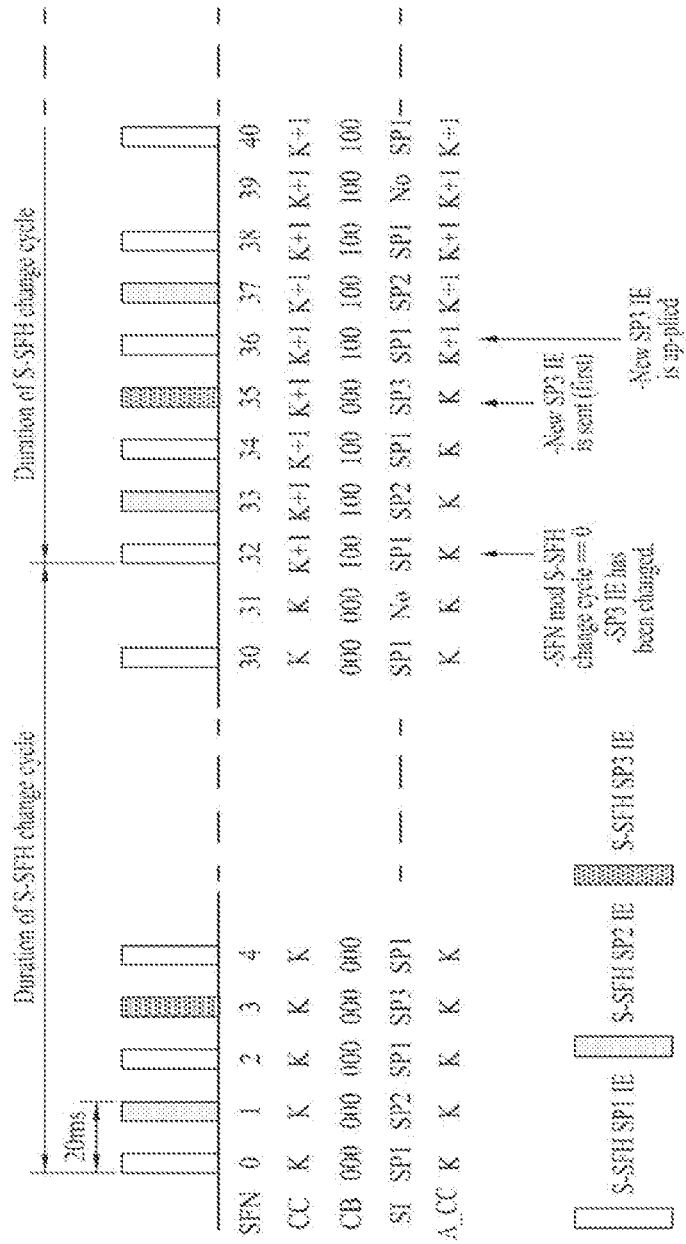
FIG. 9 exemplarily shows an S-SFH update procedure.

FIG. 9 exemplarily shows an S-SFH update procedure. Specifically, FIG. 9 shows an S-SFH update procedure when S-SFH SP3 is changed. In FIG. 9, S-SFH SP1 has a period of 40 ms, S-SFH SP2 has a period of 80 ms, and S-SFH SP3 has a period of 160 ms. The S-SFH change cycle includes 32 superframes.

Necessary system parameters and system configuration information included in the S-SFH may be carried by three S-SFH SP information elements (IEs) (e.g., SP1, SP2, and SP3). Period information of the three S-SFH SP IEs has already been disclosed in Table 1.

At intervals of a superframe, the BS transmits a P-SFH IE that includes S-SFH scheduling information, S-SFH change count, S-SFH SP change bitmap, and an S-SFH application hold indicator.

The S-SFH change count remains constant as long as all values in the S-SFH IEs remain constant. The S-SFH change count is incremented only in a specific SFN that satisfies 'modulo {SFN, S-SFH change cycle}=0'. The S-SFH change cycle means a minimum duration in which contents of S-SFH remain the same. The S-SFH change cycle may be transmitted to the UE through SFH. For example, S-SFH SP3 may include information indicating the S-SFH change cycle using the following Table 3.

TABLE 3

| S-SFH change cycle | Number of superframes |
|---|---|
| 0b000 | 16 |
| 0b001 | 32 |
| 0b010 | 64 |
| 0b011~0b111 | Reserved |

If the value contained in an arbitrary S-SFH IE is changed during the duration of one S-SFH change cycle, the S-SFH change count is increased by one in a superframe (i.e., the next superframe satisfying 'modulo{SFN, S-SFH change cycle}=0') at which the next duration of the S-SFH change cycle is started.

If the S-SFH change count is modified, the modified S-SFH change count (satisfying 'modulo{SFN, S-SFH change cycle}=0') is maintained until the next superframe. If the UE determines that the S-SFH change count field contained in a P-SFH is unchanged, the UE determines that the S-SFH has the latest information.

Each bit of the S-SFH change bitmap may indicate a change state of the corresponding S-SFH SP IE in association with the S-SFH change count. For example, Bit #0 (least significant bit), Bit #1 and Bit #2 (most significant bit) may be mapped to S-SFH SP1 IE, S-SFH SP2 IE and S-SFH SP3 IE, respectively. If an arbitrary value contained in one S-SFH SP IE is changed, a bit corresponding to the changed S-SFH SP IE may be set to '1'. The value of an S-SFH SP change bitmap may be changed only when the S-SFH change count is changed. That is, the modified S-SFH SP change bitmap is maintained until the next superframe in which the S-SFH change count is incremented.

S-SFH SPx IE(s) associated with the incremented S-SFH change count may be transmitted, starting from a superframe in which the S-SFH change count is changed, in superframes in which S-SFH SPx is scheduled. If contents contained in the S-SFH IEs are changed, all values contained in the S-SFH IEs are unchanged during one or more S-SFH change cycle periods until the S-SFH change count is re-changed.

In order to guarantee enough time in which the UE can receive the changed S-SFH SPx IE(s), the changed contents start to be applied at a specific SFN where the S-SFH SPx is determined by the changed SFN. For example, if S-SFH SP3 IE is changed, changed contents contained in the S-SFH SP3 IE are applied in a superframe located just after a superframe in which the changed S-SFH SP3 IE is transmitted. Referring to FIG. 9, if the BS initially transmits a new S-SFH SP3 IE at a superframe 35 in which S-SFH SP3 is scheduled, the UE may apply the S-SFH SP3 to a superframe 36 located just after a superframe 35 initially receiving the new S-SFH SP3 IE.

Referring to FIG. 8, provided that each cell transmits the S-SFH SP3 at the same period and a new S-SFH SP3 is transmitted at the same superframe, each UE located at cooperative cells may apply a new S-SFH SP3 at the same superframe. For example, provided that a new SP3 of the cell A and a new SP3 of the cell B are initially transmitted at the superframe N+12, UE A may apply a new SP3 of the cell A at the superframe N+13, and UE B may apply a new SP3 of the cell B at the superframe N+13. In this case, if $D\text{-}LBS_{ZP}$ is composed of 16 superframes, $SFN_{S\text{-}SFH(SP3)}$ of Equation 1 becomes equal, such that $SFN_{Initialstartpoint}$ also becomes equal assuming that $D\text{-}LBS_{ZP}$ is the same. Therefore, the BS A and the BS B start D-LBS zone transmission at the superframe N+16.

The first embodiment of the present invention has an advantage in that it can arrange D-LBS zone transmission without affecting a cell common SFH such as D-LBS zone configuration information.

However, according to the first embodiment of the present invention, even though not all SFH IEs are cell common information, SFH SPx is transmitted at a fixed time point at intervals of a fixed period. In addition, provided that it is allowed that cooperative cells configure D-LBS zones at different transmission periods, $SFN_{Initialstartpoint}$ may be changed in cells having different D-LBS zone transmission periods. Therefore, according to the first embodiment of the present invention, a transmission start time of the SP3 and a transmission period of the SP3 are fixed such that cooperative cells have to transmit a new SP3 at the same superframe and cooperative cells also have to transmit a D-LBS zone at the same period. In this way, the first embodiment of the present invention has a disadvantage in that SFH IE cannot be flexibly utilized.

Method 2: Flexible Transmission Time and Period for S-SFH SP3

In order to flexibly cope with a variation in the cell environment, it is preferable that D-LBS zone configuration information may be freely transmitted. That is, it is preferable that transmission time and/or transmission period of D-LBS zone configuration information may be changed according to the cell environment.

Second Embodiment

Figure 10:
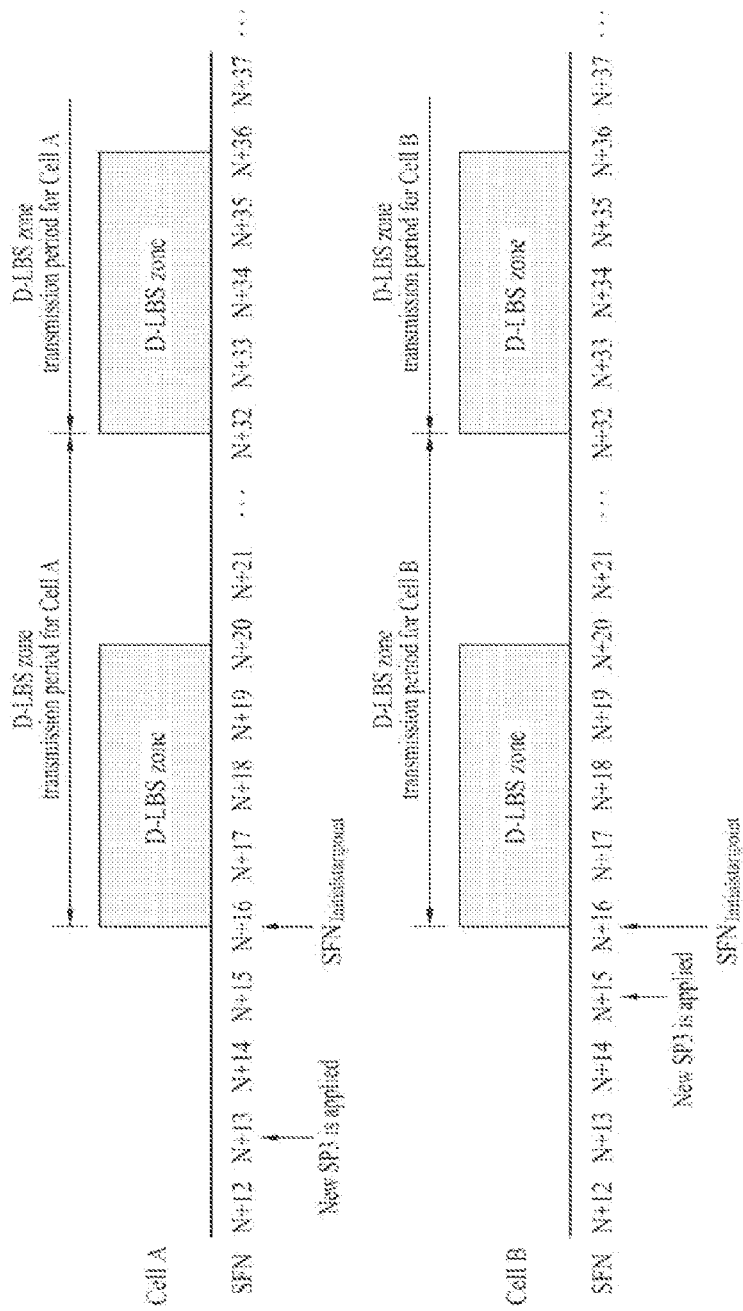
FIGS. 10 and 11 exemplarily show a method for arranging a D-LBS zone according to a second embodiment of the present invention.
Figure 11:
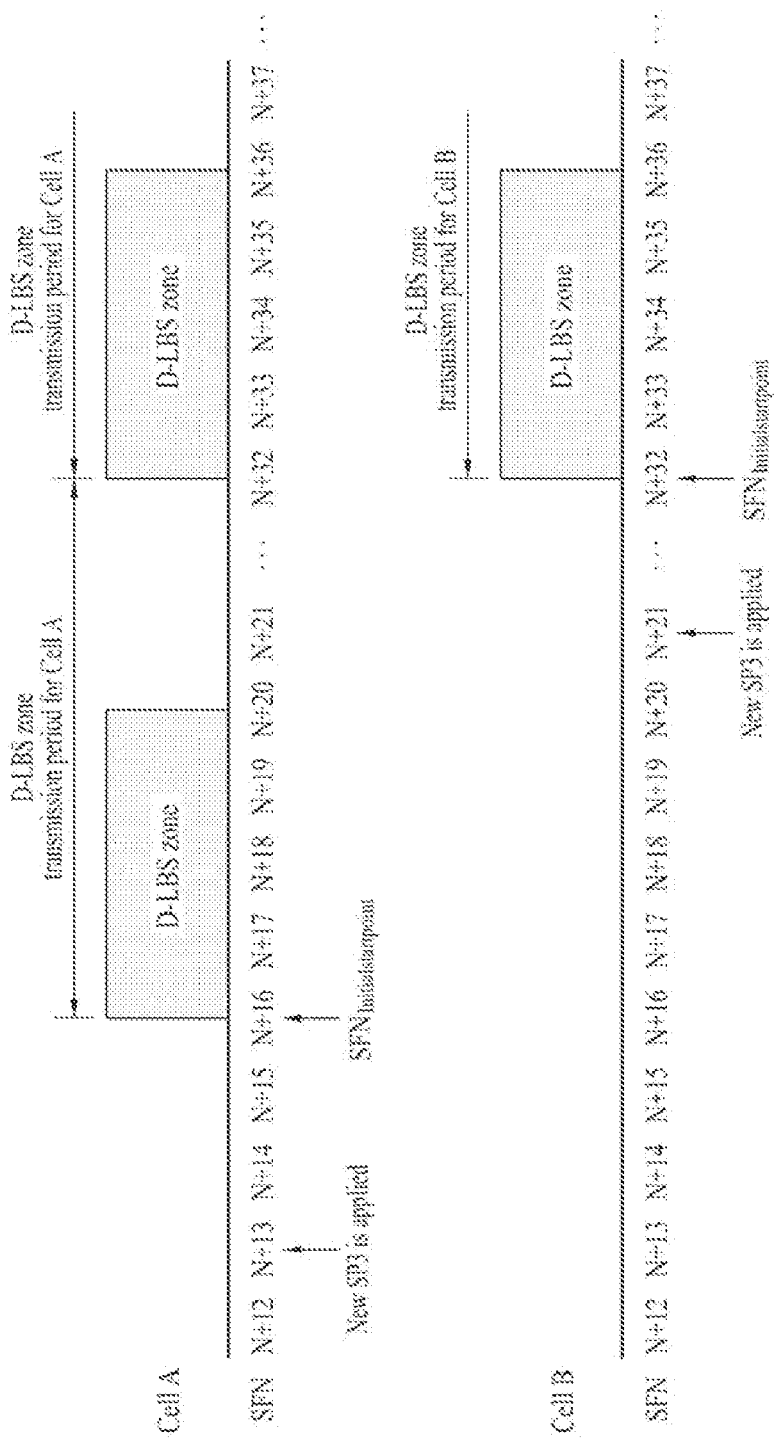

FIGS. 10 and 11 exemplarily show a method for arranging a D-LBS zone according to a second embodiment of the present invention. In FIGS. 10 and 11, it is assumed that D-LBS$_{ZP}$ is 16 superframes.

Referring to FIG. 10, although the cell A and the cell B have different SP3 application time points, the BS A and the BS B may start D-LBS zone transmission in the same superframe. For example, if the BS A supporting the cell A transmits a new SP3 at the superframe N+12, the UE A located at the cell A applies the new SP3 in the superframe N+13. In this case, according to Equation 1, the BS A starts to transmit a D-LBS zone having an LBS location beacon of the cell A from the superframe N+16, and periodically transmits the D-LBS zone to the cell A. If the BS B supporting the cell B transmits a new SP3 at the superframe N+14, the UE B located at the cell B may apply the new SP3 in the superframe N+15. In this case, according to Equation 1, the BS B starts to transmit a D-LBS zone having an LBS location beacon of the cell B from the superframe N+16, and periodically transmits the D-LBS zone to the cell B. In this way, although the new D-LBS zone configuration information is transmitted at different superframes according to the cells, initial transmission time points of the D-LBS zone according to the new configuration information may be arranged in the same superframe.

However, according to the second embodiment of the present invention, if a superframe at which a new SP3 of a specific cooperative cell is applied is located behind SFN$_{Initialstartpoint}$ determined on the basis of an SFN at which a new SP3 of another cooperative cell is applied, initial start points of the D-LBS zones may not be arranged. Referring to FIG. 11, if the new SP3 of the cell A is applied in the superframe N+13, SFN$_{Initialstartpoint}$ may be determined to be N+16 according to Equation 1. However, a new SP3 of the cell B is applied at the superframe N+21, such that SFN$_{Initialstartpoint}$ corresponding to the new SP3 of the cell B may be set to N+32 according to Equation 1. In this way, in the case where application points of the SP3 are not all contained in one cycle of a D-LBS zone period and there is an application point of the SP3 outside the one cycle, transmission start points of the D-LBS zone may not be arranged in the same superframe.

Third Embodiment

The third embodiment of the present invention defines/limits SFH transmission to be arranged among cells, under the condition that a cell common SFH SP such as D-LBS zone configuration information, instead of all SFH SP IEs needs to be applied. For example, an offset field for arranging a D-LBS zone initial start point may be established in a Medium Access Control (MAC) control message including S-SFH SP3 or cell-specific information. If cooperative cells may change or initially generate D-LBS zone configuration information, each cooperative cell may transmit an offset through a MAC control message and determine a D-LBS zone start point according to the offset. The UE may receive the offset and determine a D-LBS zone start point of the corresponding cell.

According to the third embodiment of the present invention, the SFH or MAC control message needs to be modified to carry the offset field for D-LBS zone arrangement.

Fourth Embodiment

Figure 12:
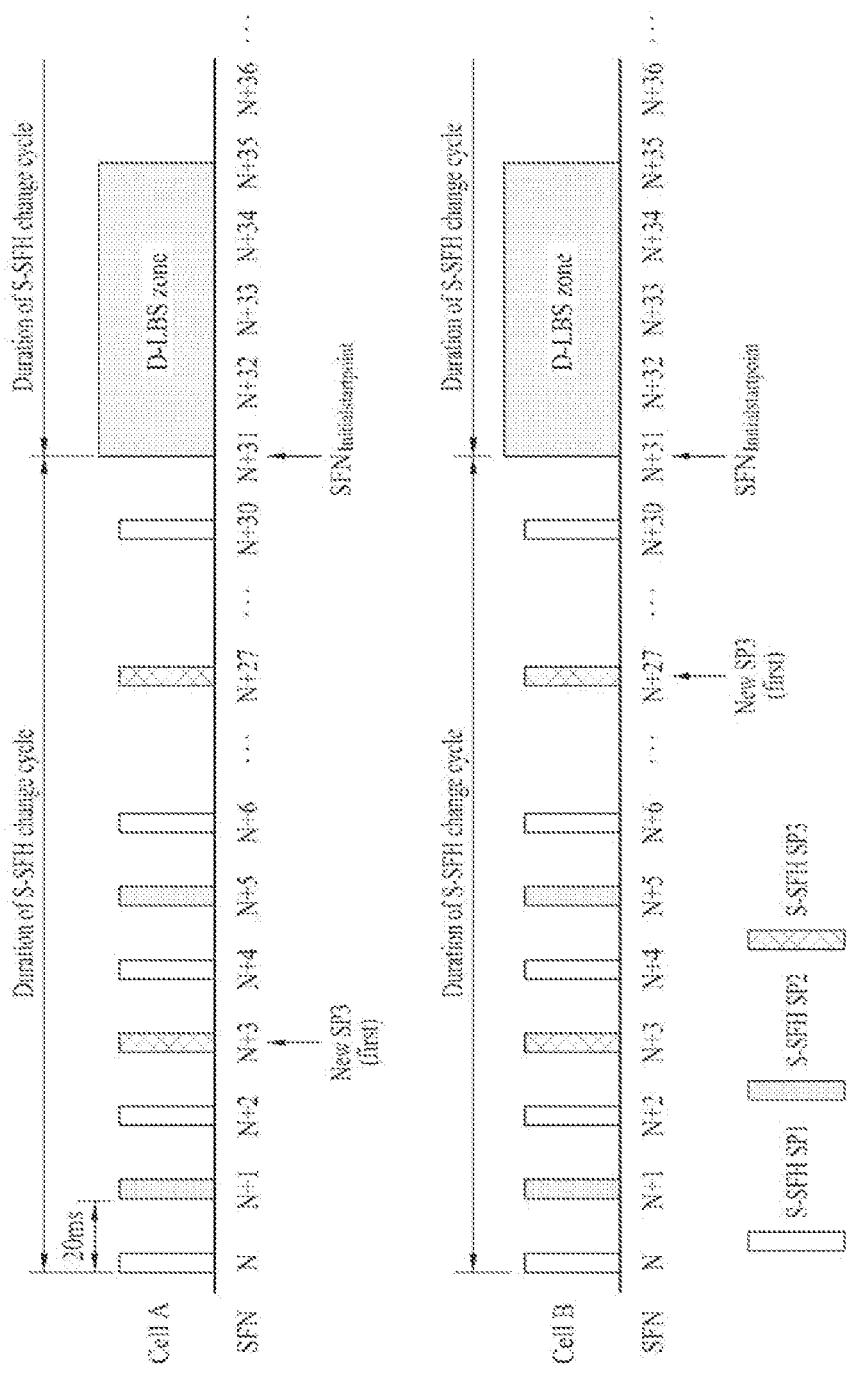
FIGS. 12 and 13 exemplarily show a method for arranging a D-LBS zone according to a fourth embodiment of the present invention.
Figure 13:
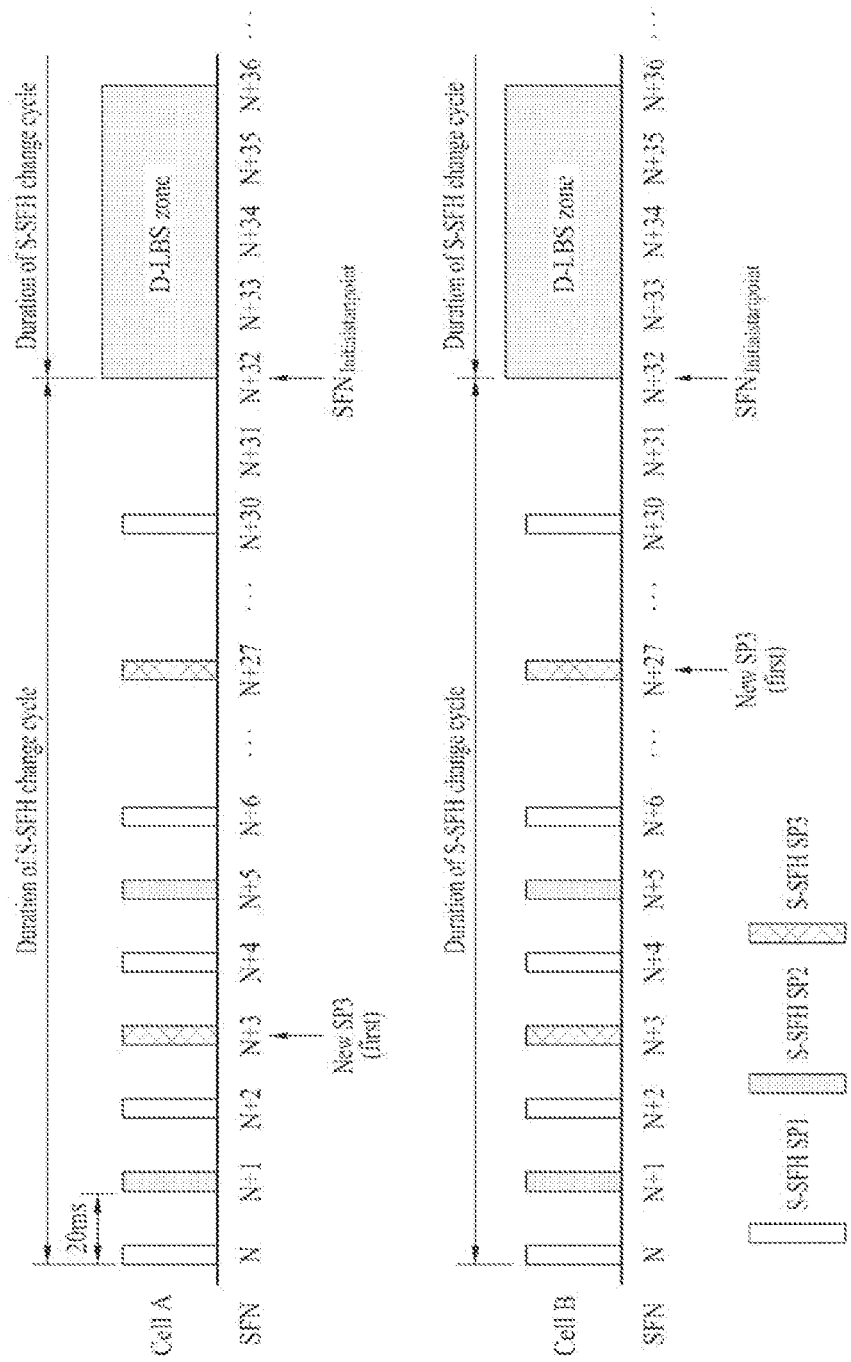

FIGS. 12 and 13 exemplarily show a method for arranging a D-LBS zone according to a fourth embodiment of the present invention. In FIGS. 12 and 13, it is assumed that the S-SFH change cycle includes 32 superframes.

In the fourth embodiment of the present invention, the initial/changed start point of the D-LBS zone is established in the last superframe (See the embodiment 4-1) contained in the S-SFH change cycle to which the new SP3 pertains, or is established in a first superframe (See the embodiment 4-2) contained in the next S-SFH change cycle of the S-SFH change cycle to which the new SP3 pertains.

Referring to FIG. 12, according to the embodiment 4-1 of the present invention, transmission of a D-LBS zone based on new D-LBS zone configuration information starts from the last superframe in the S-SFH change cycle including a superframe at which the new D-LBS zone configuration information is transmitted. That is, SFN$_{Initialstartpoint}$ may correspond to the last superframe of the S-SFH change cycle in which new D-LBS zone configuration information is transmitted. According to the embodiment 4-1 of the present invention, SFN$_{Initialstartpoint}$ may satisfy 'modulo {SFN$_{Initialstartpoint}$+1, S-SFH change cycle}=0'.

Referring to FIG. 13, according to the embodiment 4-2 of the present invention, transmission of a D-LBS zone based on new D-LBS zone configuration information starts from a superframe (i.e., a first superframe of the next S-SFH change cycle) located just after the S-SFH change cycle including a superframe at which the new D-LBS zone configuration information is transmitted. That is, SFN$_{Initialstartpoint}$ may correspond to the next superframe of the S-SFH change cycle in which new D-LBS zone configuration information is transmitted. According to the embodiment 4-2 of the present invention, SFN$_{Initialstartpoint}$ may satisfy 'modulo {SFN$_{Initialstartpoint}$, S-SFH change cycle}=0'.

According to the fourth embodiment of the present invention, assuming that cooperative cells transmit new SP3s in the same S-SFH change cycle, although the cooperative cells transmit the new SP3s in different superframes, transmission of D-LBS zones of the cooperative cells may start from the same superframe.

Fifth Embodiment

Figure 14:
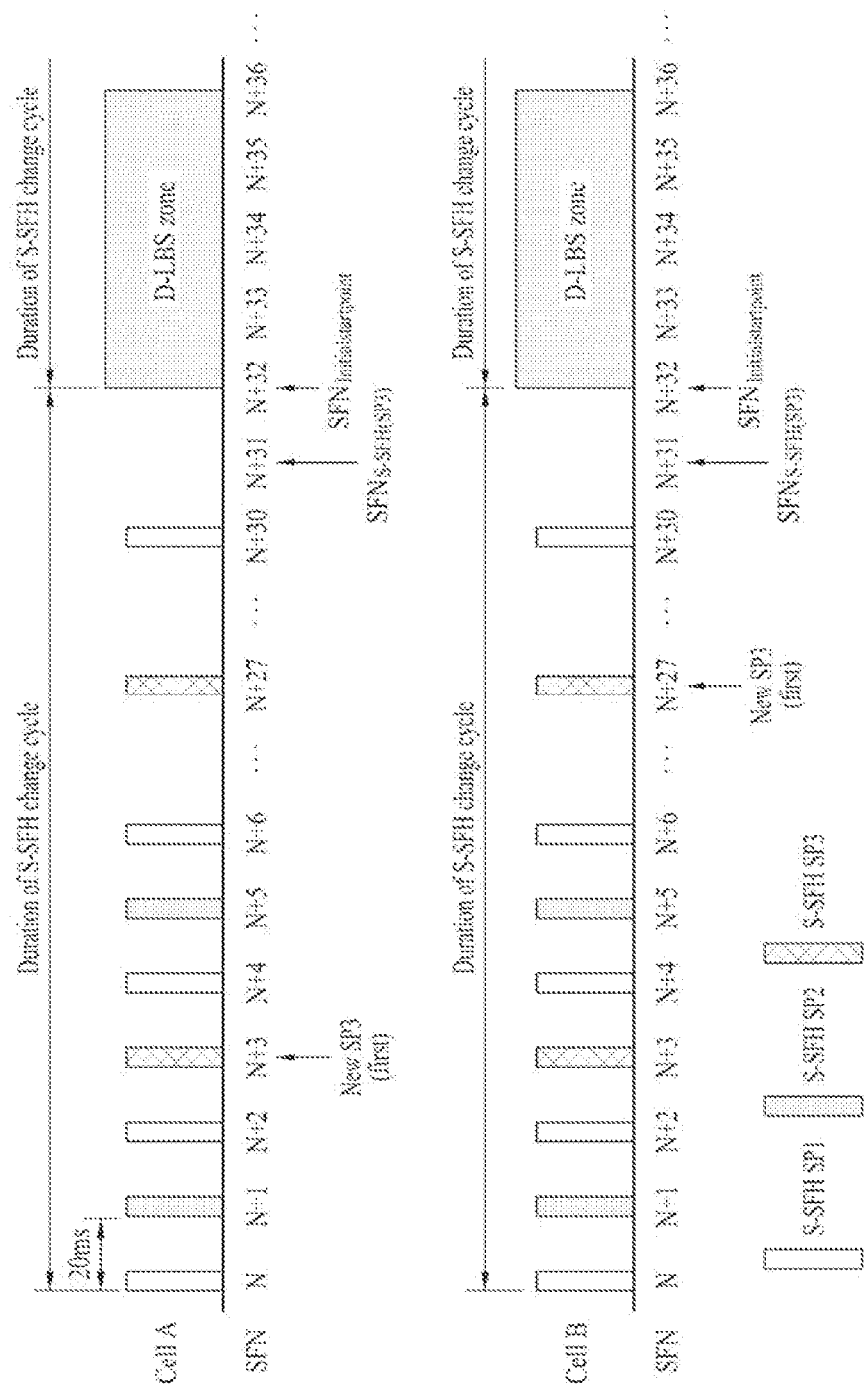
FIG. 14 exemplarily shows a method for arranging a D-LBS zone according to a fourth embodiment of the present invention.

FIG. 14 exemplarily shows a method for arranging a D-LBS zone according to a fourth embodiment of the present invention. In FIG. 14, it is assumed that the S-SFH change cycle includes 32 superframes.

In the fifth embodiment of the present invention, a superframe having $SFN_{Initialstartpoint}$ satisfying the following equation 2 may be defined as a transmission start point of a new D-LBS zone.

$$SFN_{Initialstartpoint} = mod(SFN_{S\text{-}SFH(SP3)} + D\text{-}LBS_{ZP} - mod(SFN_{S\text{-}SFH(SP3)}, D\text{-}LBS_{ZP}), 2^{12})$$

[Equation 2]

$SFN_{Initialstartpoint}$ and $LBS_{ZP}$ shown in Equation 2 may be identical to $SFN_{Initialstartpoint}$ and $LBS_{ZP}$ shown in Equation 1. However, $SFN_{S\text{-}SFH(SP3)}$ shown in FIG. 2 does not mean an SFN of a superframe in which a new SP3 is applied, but means an SFN of the last superframe of the S-SFH change cycle to which the new SP3 belongs. In other words, according to the fifth embodiment of the present invention, the last superframe of the S-SFH change cycle having an S-SFH SP3 including the changed or new D-LBS zone configuration information is used to determine an initial start point of the D-LBS zone.

Referring to FIG. 14, the BS A supporting the cell A may transmit a new SP3 having new D-LBS zone configuration information for the cell A at the superframe N+3, and the BS B supported by the cell B may transmit a new SP3 having new D-LBS zone configuration information for the cell B at the superframe N+27. The new SP3 of the cell A and the new SP3 of the cell B are transmitted in the S-SFH change cycle (hereinafter referred to as 'S-SFH change cycle 1') spanning the superframes N to N+31. The BS A may set the SFN of the last superframe (i.e., the superframe N+31) of the S-SFH change cycle 1 to $SFN_{S\text{-}SFH(SP3)}$ of Equation 2, such that $SFN_{Initialstartpoint}$ for the cell A is determined. Since a new SP3 for the cell B is transmitted in the S-SFH change cycle 1, the BS B may set the SFN of the last superframe (i.e., the superframe N+31) of the S-SFH change cycle 1 to $SFN_{S\text{-}SFH(SP3)}$ of Equation 2, such that $SFN_{Initialstartpoint}$ for the cell B is determined. If it is assumed that $D\text{-}LBS_{ZP}$ of each cell includes 16 superframes, in association with the cell A and the cell B, factors (i.e., $SFN_{S\text{-}SFH(SP3)}$ and $D\text{-}LBS_{ZP}$) used for $SFN_{Initialstartpoint}$ determination are identical to each other in Equation 2, such that both the BS A and the BS B can determine the superframe N+32 as $SFN_{Initialstartpoint}$. That is, the BS A transmits a D-LBS zone including an LBS location beacon of the cell A starting from the superframe N+32. The BS B transmits a D-LBS zone including an LBS location beacon of the cell B starting from the superframe N+32.

On the other hand, although the cooperative cells exemplarily have the same $D\text{-}LBS_{ZP}$ of 16 for convenience of description, it should be noted that common multiples of 4 less than the S-SFH change cycle may be freely selected as $D\text{-}LBS_{ZP}$ for cooperative cells. For example, provided that only 4, 16, or 32 superframes are used as a D-LBS zone transmission period according to Table 2, although D-LBS transmission periods for cooperative cells are different from each other in association with the S-SFH change cycle of 32 superframes, the same $SFN_{Initialstartpoint}$ can be obtained.

In accordance with the fourth and fifth embodiments of the present invention, the S-SFH change cycle is used as a reference point so that $SFN_{Initialstartpoint}$ is determined. In the fourth and fifth embodiments of the present invention, at least the cooperative cells have to transmit the new SP within the same S-SFH change cycle, such that D-LBS zone transmission for several cooperative cells that negotiate for LBS can be started from the same superframe. For this purpose, each BS according to the fourth or fifth embodiment negotiates with a BS of another cell participating in LBS location measurement such that the S-SFH change cycle can be equally adjusted. Alternatively, provided that the S-SFH change cycle having a different length in each cell is allowed, each BS participating in location measurement may transmit a new SP3 in consideration of the longest S-SFH change cycle from among S-SFH change cycles of cooperative cells.

Figure 15:
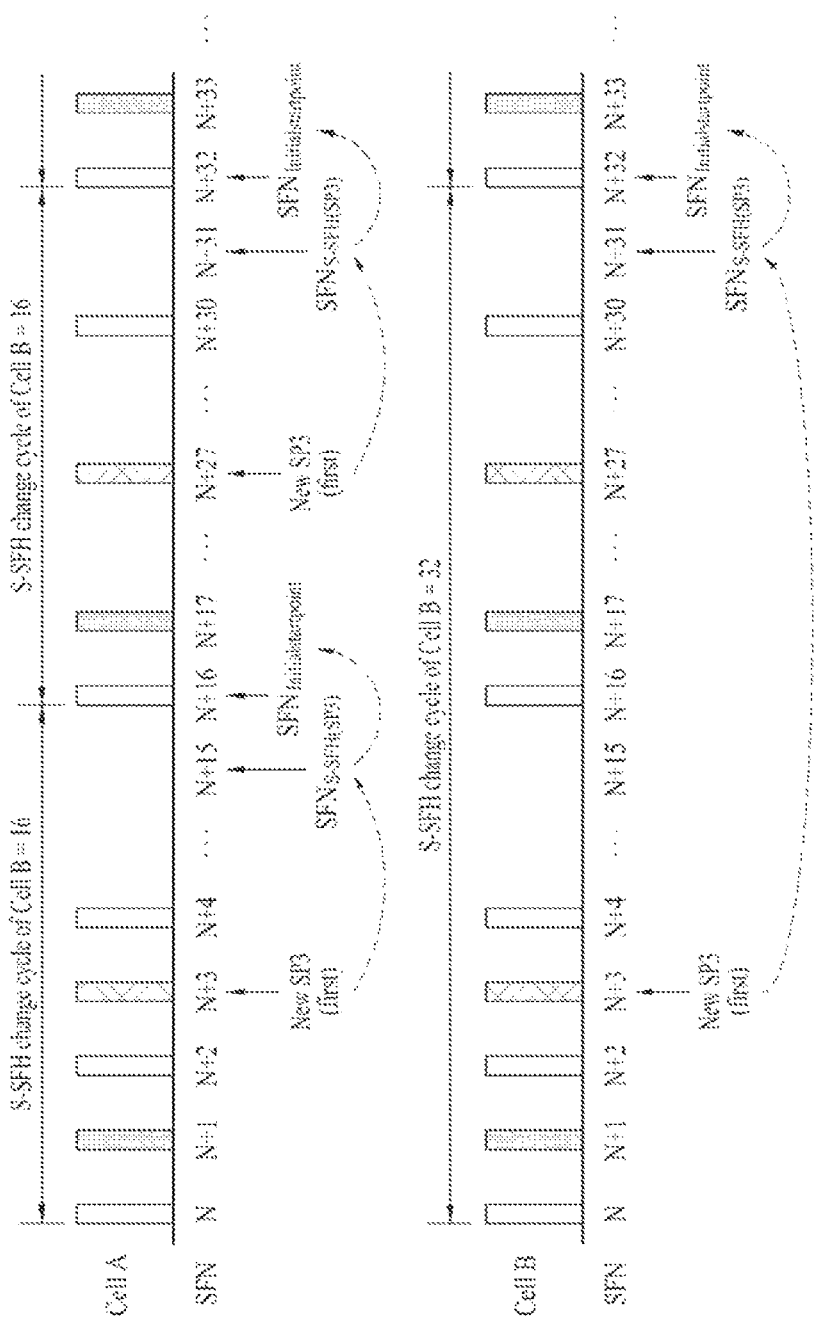
FIG. 15 exemplarily shows a method for transmitting D-LBS zone configuration information in cells that use different S-SFH change cycles.

FIG. 15 exemplarily shows a method for transmitting D-LBS zone configuration information in cells that use different S-SFH change cycles.

Referring to FIG. 15, different S-SFH change cycles may be applied to the cells A and B participating in LBS location measurement. It is assumed that the S-SFH change cycle of the cell A includes 16 superframes and the S-SFH change cycle of the cell B includes 32 superframes. The BS A supporting the cell A and the BS B supporting the cell B may negotiate or adjust D-LBS zone configuration. If the BS A and the BS B independently transmit the new/changed D-LBS zone configuration information, new D-LBS zone configuration information for the cell A may be transmitted within the S-SFH change cycle of the cell A spanning from a superframe N to a superframe N+15, and new D-LBS zone configuration information of the cell B may be transmitted within the S-SFH change cycle of the cell B spanning from a superframe N to the other superframe N+31. In this case, according to the fourth and fifth embodiments of the present invention, $SFN_{Initialstartpoint}$ may be differently assigned to the cell A and the cell B. For example, according to the fifth embodiment, if $D\text{-}LBS_{ZP}$ is set to 16 (i.e., $D\text{-}LBS_{ZP}=16$), $SFN_{Initialstartpoint}$ for the cell B may be N+32 whereas $SFN_{Initialstartpoint}$ for the cell A may be N+16. Therefore, transmission start of the LBS location beacon of the cell A and transmission start of the LBS location beacon of the cell B may occur in different superframes. In order to prevent such transmission start operations of the cells A and B from occurring in different superframes, if other S-SFH change cycles of the cooperative cells are allowed, the BS of the present invention may transmit new D-LBS zone configuration information in consideration of the longest S-SFH change cycle. For example, referring to FIG. 15, the BS A may transmit new D-LBS zone configuration information in the next S-SFH change cycle but not the first S-SFH change cycle in such a manner that $SFN_{Initialstartpoint}$ for the cell A may be determined to be $SFN_{Initialstartpoint}$ determined on the basis of 32 superframes corresponding to the longest S-SFH change cycle. That is, the BS A may transmit D-LBS zone configuration information in the S-SFH change cycle of the cell A spanning from a superframe N+16 to the other superframe N+31. In this case, transmission of the new D-LBS zone for the cell A may start from the same superframe as in a new D-LBS zone for the cell B. For example, according to the fifth embodiment, provided that $D\text{-}LBS_{ZP}$ is set to 16 (i.e., $D\text{-}LBS_{ZP}=16$) and the SP3 of the cell A is transmitted from a superframe in which S-SFH SP3 is scheduled from among superframes N+16 to N+31, $SFN_{Initialstartpoint}$ of the cell A may be N+32 such that it may be identical to $SFN_{Initialstartpoint}$ of the cell B.

According to the embodiments of the present invention, a D-LBS transmission start point may be arranged between cells participating in LBS location measurement.

In addition, the embodiments of the present invention can improve a location measurement performance or throughput using a DL-LBS location measurement reference signal.

As is apparent from the above description, exemplary embodiments of the present invention have the following effects. The embodiments of the present invention can minimize influence of a legacy radio frame structure, and can transmit a location measurement reference signal for a location based service.

In addition, the embodiments of the present invention can reduce interference between cells participating in location measurement, thereby improving location measurement throughput of the UE on the basis of the location measurement reference signal.

According to the embodiments of the present invention, each cell can freely transmit information regarding transmission of the corresponding location measurement reference signal to the user equipment (UE).

According to the embodiments of the present invention, the UE and the BS can easily recognize time resources related to location measurement reference signal transmission.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to a base station (BS), a user equipment (UE), or other communication devices in a wireless communication system.

What is claimed is:

1. A method for transmitting a location measurement reference signal for a location based service by a base station (BS) in a wireless communication system, the method comprising:
   transmitting configuration information of a location measurement zone spanning one or more superframes to transmit the location measurement reference signal; and
   transmitting the location measurement zone starting from a superframe having a superframe number (SFN) satisfying the following equation, according to the configuration information, $$\mathrm{mod}(SFN_{S\text{-}SFH(SP3)} + \text{D-LBS}_{ZP} - \mathrm{mod}(SFN_{S\text{-}SFH(SP3)}, \text{D-LBS}_{ZP}), 2^{12})$$ [Equation]

where $SFN_{S\text{-}SFH(SP3)}$ is the last superframe number in a secondary superframe header (S-SFH) change cycle including the configuration information, and $\text{D-LBS}_{ZP}$ is a transmission period of the location measurement zone.

2. The method according to claim 1, wherein the configuration information includes information indicating the transmission period of the location measurement zone.

3. The method according to claim 1, wherein the S-SFH change cycle is a minimum duration in which contents of S-SFH remain same.

4. A method for receiving a location measurement reference signal for a location based service by a user equipment (UE) in a wireless communication system, the method comprising:
   receiving configuration information of a location measurement zone spanning one or more superframes from a base station (BS); and
   receiving the location measurement zone starting from a superframe having a superframe number (SFN) satisfying the following equation, according to the configuration information, $$\mathrm{mod}(SFN_{S\text{-}SFH(SP3)} + \text{D-LBS}_{ZP} - \mathrm{mod}(SFN_{S\text{-}SFH(SP3)}, \text{D-LBS}_{ZP}), 2^{12})$$ [Equation]

where $SFN_{S\text{-}SFH(SP3)}$ is the last superframe number in a secondary superframe header (S-SFH) change cycle including the configuration information, and $\text{D-LBS}_{ZP}$ is a transmission period of the location measurement zone.

5. The method according to claim 4, wherein the configuration information includes information indicating the transmission period of the location measurement zone.

6. The method according to claim 4, wherein the S-SFH change cycle is a minimum duration in which contents of S-SFH remain same.

7. The method according to claim 4, further comprising:
   measuring location-associated information determining the location of the user equipment (UE) using the location measurement reference signal received on the location measurement zone.

8. A base station (BS) for transmitting a location measurement reference signal for a location based service in a wireless communication system, the base station (BS) comprising:
   a transmitter; and
   a processor configured to control the transmitter,
   wherein the processor controls the transmitter to transmit configuration information of a location measurement zone spanning one or more superframes to transmit the location measurement reference signal, and controls the transmitter to transmit the location measurement zone starting from a superframe having a superframe number (SFN) satisfying the following equation, according to the configuration information, $$\mathrm{mod}(SFN_{S\text{-}SFH(SP3)} + \text{D-LBS}_{ZP} - \mathrm{mod}(SFN_{S\text{-}SFH(SP3)}, \text{D-LBS}_{ZP}), 2^{12})$$ [Equation]

where $SFN_{S\text{-}SFH(SP3)}$ is the last superframe number in a secondary superframe header (S-SFH) change cycle including the configuration information, and $\text{D-LBS}_{ZP}$ is a transmission period of the location measurement zone.

9. The base station (BS) according to claim 8, wherein the configuration information includes information indicating the transmission period of the location measurement zone.

10. The base station (BS) according to claim 8, wherein the S-SFH change cycle is a minimum duration in which contents of S-SFH remain same.

11. A user equipment (UE) for transmitting a location measurement reference signal for a location based service in a wireless communication system, the user equipment (UE) comprising:
    a receiver; and
    a processor configured to control the receiver,
    wherein the receiver is configured to receive configuration information of a location measurement zone spanning one or more superframes, and the processor controls the receiver to receive the location measurement zone starting from a superframe having a superframe number (SFN) satisfying the following equation, according to the configuration information, $$\mathrm{mod}(SFN_{S\text{-}SFH(SP3)} + \text{D-LBS}_{ZP} - \mathrm{mod}(SFN_{S\text{-}SFH(SP3)}, \text{D-LBS}_{ZP}), 2^{12})$$ [Equation]

where $SFN_{S\text{-}SFH(SP3)}$ is the last superframe number in a secondary superframe header (S-SFH) change cycle including the configuration information, and $\text{D-LBS}_{ZP}$ is a transmission period of the location measurement zone.

12. The user equipment (UE) according to claim 11, wherein the configuration information includes information indicating the transmission period of the location measurement zone.

13. The user equipment (UE) according to claim 11, wherein the S-SFH change cycle is a minimum duration in which contents of S-SFH remain same.

14. The user equipment (UE) according to claim 11, wherein the processor is configured to measure location-associated information determining the location of the user equipment (UE) using the location measurement reference signal received on the location measurement zone.

* * * * *